United States Patent
Kovachka-Dimitrova et al.

(10) Patent No.: US 7,562,341 B2
(45) Date of Patent: Jul. 14, 2009

(54) DEPLOY CALLBACK SYSTEM WITH BIDIRECTIONAL CONTAINERS

(75) Inventors: Monika M. Kovachka-Dimitrova, Sofia (BG); Rumiana G. Angelova, Dimitrovgrad (BG)

(73) Assignee: SAP AG, Walldorf (DE)

( * ) Notice: Subject to any disclaimer, the term of this patent is extended or adjusted under 35 U.S.C. 154(b) by 930 days.

(21) Appl. No.: 10/852,978

(22) Filed: May 24, 2004

(65) Prior Publication Data
US 2005/0273787 A1 Dec. 8, 2005

(51) Int. Cl.
G06F 9/44 (2006.01)
(52) U.S. Cl. .................... 717/107; 717/100
(58) Field of Classification Search .............. 717/100, 717/107
See application file for complete search history.

(56) References Cited

U.S. PATENT DOCUMENTS

| | | | |
|---|---|---|---|
| 5,999,972 A | 12/1999 | Gish | |
| 6,253,282 B1 | 6/2001 | Gish | |
| 6,266,709 B1 | 7/2001 | Gish | |
| 6,272,555 B1 | 8/2001 | Gish | |
| 6,272,556 B1 | 8/2001 | Gish | |
| 6,304,893 B1 | 10/2001 | Gish | |
| 6,424,991 B1 | 7/2002 | Gish | |
| 6,434,598 B1 | 8/2002 | Gish | |
| 6,604,209 B1 | 8/2003 | Grucci et al. | |
| 6,643,650 B1 * | 11/2003 | Slaughter et al. | 707/10 |
| 6,766,477 B2 | 7/2004 | Grucci et al. | |
| 7,080,092 B2 * | 7/2006 | Upton | 707/102 |
| 7,089,584 B1 | 8/2006 | Sharma | |
| 7,159,224 B2 | 1/2007 | Sharma et al. | |
| 7,167,914 B2 | 1/2007 | Cohen et al. | |
| 7,246,358 B2 | 7/2007 | Chinnici et al. | |
| 2001/0011265 A1 | 8/2001 | Cuan et al. | |
| 2002/0178254 A1 | 11/2002 | Brittenham et al. | |
| 2003/0018694 A1 | 1/2003 | Chen et al. | |
| 2003/0050932 A1 | 3/2003 | Pace et al. | |
| 2003/0061247 A1 | 3/2003 | Renaud | |
| 2003/0093402 A1 | 5/2003 | Upton et al. | |
| 2003/0154266 A1 | 8/2003 | Bobick et al. | |
| 2003/0191803 A1 | 10/2003 | Chinnici et al. | |
| 2003/0204645 A1 | 10/2003 | Sharma et al. | |
| 2004/0078495 A1 | 4/2004 | Mousseau et al. | |
| 2004/0139154 A1 | 7/2004 | Schwarze | |
| 2004/0148183 A1 | 7/2004 | Sadiq | |
| 2004/0148370 A1 | 7/2004 | Sadiq | |
| 2005/0049938 A1 | 3/2005 | Venkiteswaran | |
| 2005/0080801 A1 | 4/2005 | Kothandaraman et al. | |
| 2005/0165910 A1 | 7/2005 | Kilian | |
| 2005/0262477 A1 | 11/2005 | Kovachka-Dimitrova et al. | |

OTHER PUBLICATIONS

Client/Server Programming with JAVA and CORBA Second Edition, by Robert Orfali et al, 1998, pp. 1-230.*
""Dreamweaver MX 2004 Using Dreamweaver"", *Macromedia, Published:* Sep. 10, 2003, pp. 1, 2, 59-61.
Kooijmans, Alex L., et al., "Enterprise JavaBeans for z/OS and OS/390 WebSphere Application Server 4.0", *IBM Corporation: International Technical Support Organization.*, Chapter 5-7.

* cited by examiner

*Primary Examiner*—Todd Ingberg
(74) *Attorney, Agent, or Firm*—Blakely, Sokoloff, Taylor & Zafman LLP

(57) ABSTRACT

A system and method are described for facilitating communication between a server and a client using a deploy callback system. In one embodiment, deploy listener is registered to receive status information regarding deployment of application or deploy operations relating to the deployment of the application. Such status information is provided to the deploy listener.

23 Claims, 18 Drawing Sheets

DEPLOY CALLBACK SYSTEM WITH BIDIRECTIONAL CONTAINERS

BACKGROUND

1. Field of the Invention

This invention relates generally to the field of deployment. More particularly, an embodiment relates to a system and method for employing a deploy callback system to facilitate communication between servers and client when deploying entities.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft .NET standard and/or the Advanced Business Application Programming (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

The J2EE engine 130 is a tool commonly used in software development and deployment today. Generally, using the J2EE engine 130 reduces the costs and complexity associated with developing multi-tier enterprise services. Another advantage of J2EE engine 130 is that it can be relatively rapidly deployed and enhanced as the need arises. J2EE engine 130 is currently used in many large-scale application development and deployment projects for these reasons.

However, as application development projects grow larger and are diversified, deployment of applications becomes increasingly important. For example, it is useful to have an improved deployment service and management, including a variety of containers, application interfaces, transaction management and modules, notification and information status system, resource pooling, and security checks.

SUMMARY

A system and method are described for facilitating communication between a server and a client using a deploy callback system. In one embodiment, a deploy listener is registered to receive status information regarding deployment of applications and deploy operations relating the deployment of the applications. Such status information is provided to the deploy listener.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
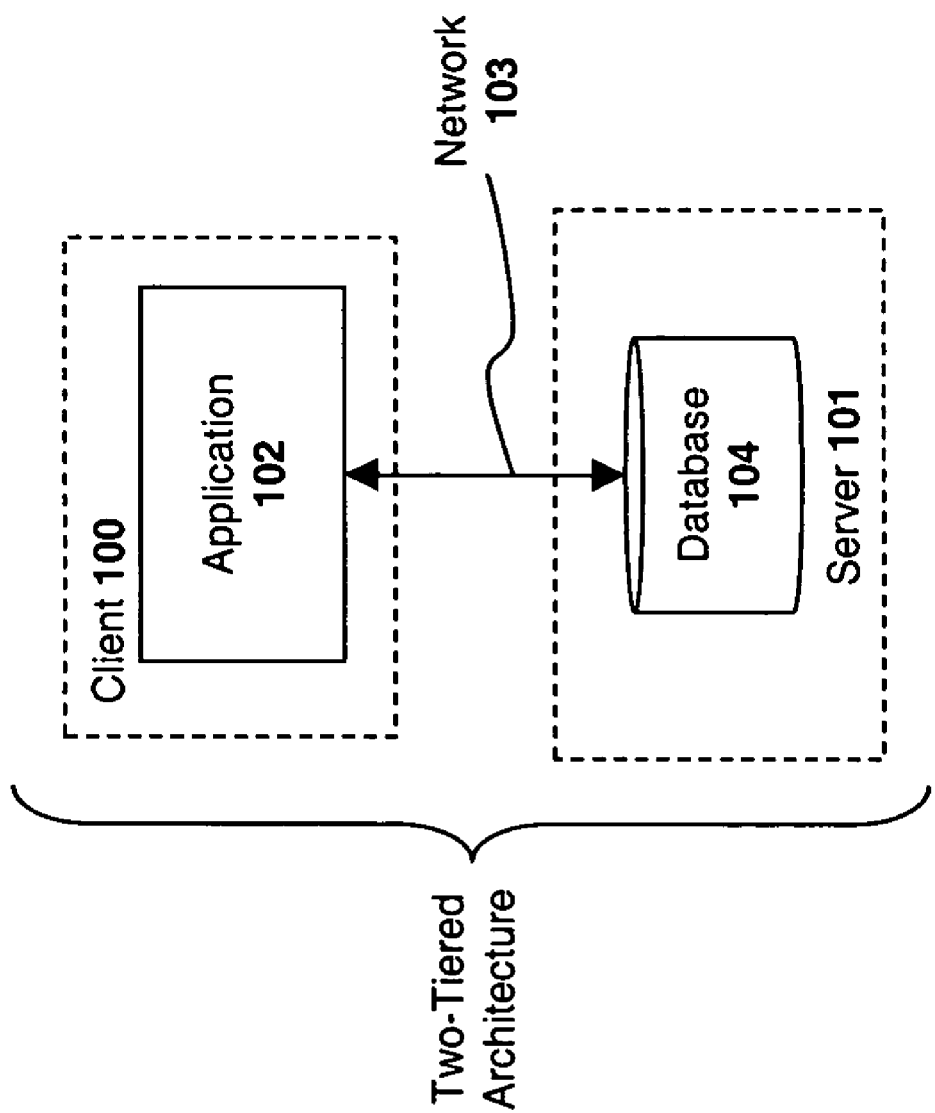
FIG. 1A is a block diagram illustrating a prior art two-tier client-server architecture.
Figure 1B:
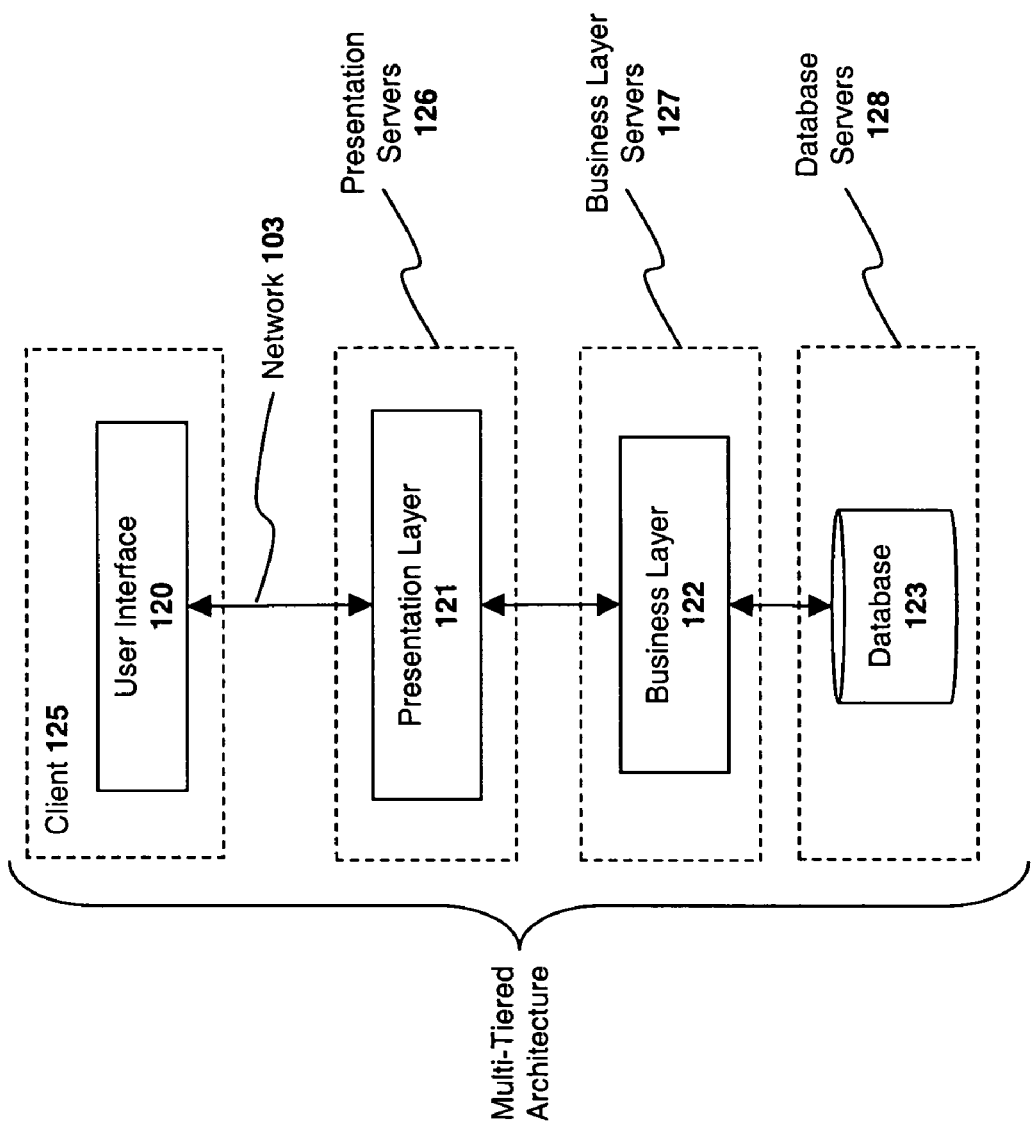
FIG. 1B is a block diagram illustrating a prior art multi-tier client-server architecture.
Figure 1C:
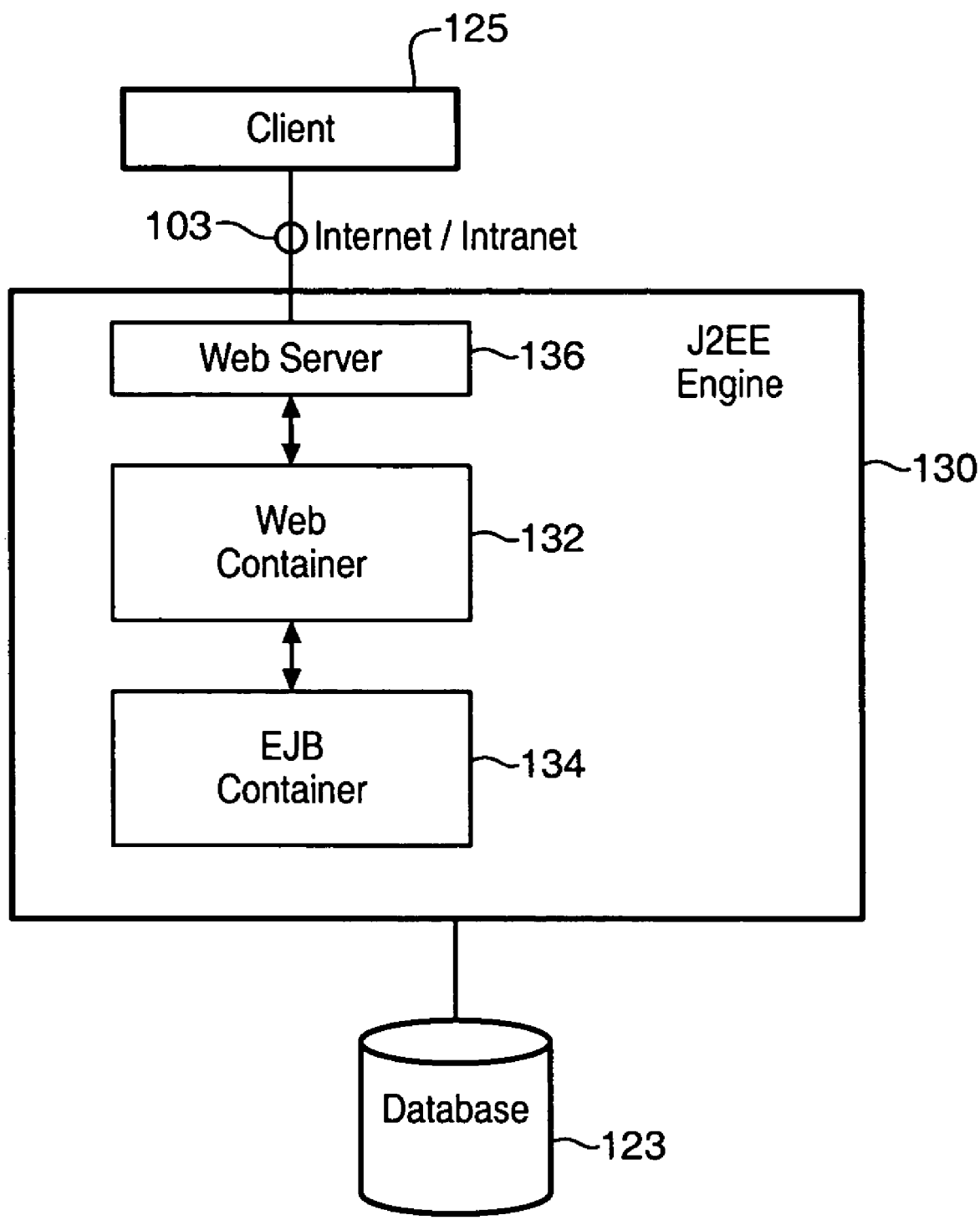
FIG. 1C is a block diagram illustrating a prior art J2EE environment.

Described below is a system and method for facilitating communication between a server and a client using a deploy callback system. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
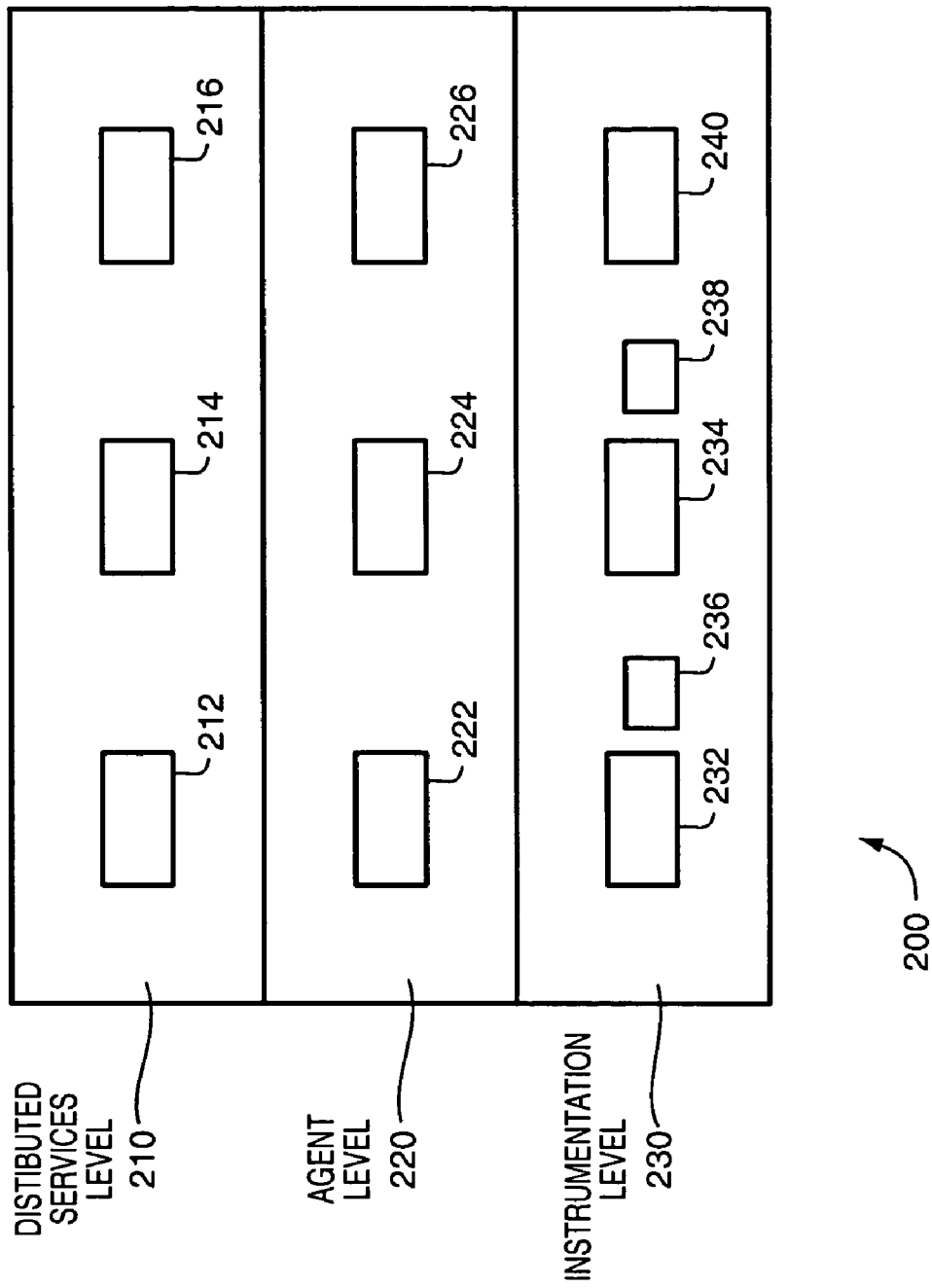
FIG. 2 is a block diagram illustrating an embodiment of a Java management architecture in which an embodiments of the present invention may be implemented.

FIG. 2 is a block diagram illustrating an embodiment of a Java management architecture (JMA) 200 in which an embodiments of the present invention may be implemented. The illustrated embodiment of JMA 200 is based on Java Management Extensions (JMX). The JMA 200 includes three layers or levels 210, 220, 230, including a distributed services level (or manager or user or client level) 210, an agent level (or application level) 220, and an instrumentation level (or database level) 230. Some or all of the elements at each of levels of the JMA 200 may be, directly or indirectly, interconnected via a network (e.g., a Local Area Network (LAN)). Alternative embodiments of the JMA 200 may include more or fewer levels.

The distributed services level 210 serves as an interface between the JMA 200 and one or more users or clients. As illustrated, the distributed services level 210 includes one or more user terminals 212-214. One or more of the user terminals 212-214 to collect and gather user input and send it to the agent level 220 over a network connection. Network connection may be a wired or wireless connection to a LAN, a Wide Area Network (WAN), a Metropolitan Area Network (MAN), an intranet, and/or the Internet. Distributed services level terminals 212-214 include personal computers, notebook computers, personal digital assistants, telephones, and the like. According to one embodiment in which the network connection connects to the Internet, one or more of the user terminals 212-214 may include a Web browser (e.g., Internet Explorer or Netscape Navigator) to interface with the Internet.

According to one embodiment, the distributed services level 210 also includes management applications 216, such as a JMX-compliant management application, a JMX manager, and/or a proprietary management application. The management applications 216 also include one or more graphical management applications, such as a visual administrator, operating to, for example, retrieve and display information received from the agent level 220 and/or the instrumentation level 230.

The visual administrator includes a monitor viewer to display such and other information. The monitor viewer may be GUI-based or Web-based monitor viewer. Management applications 216 may include third party tools including a file system to store the information. The distributed services level 210 includes the CCMS system described above.

The agent level 220 includes one or more application servers 222-226. An application server may refer to a computing device that performs data processing. The agent level 220 also includes a computing device (e.g., a dispatcher) to perform load balancing among application servers 222-226. According to one embodiment in which the agent level 220 exchanges information with the distributed services level 210 via the Internet, one or more of the application servers 222-226 include a Web application server. According to one embodiment, the application servers 222-226 are implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. In one embodiment, the management techniques described herein are used to manage resources within a "cluster" of server nodes. An exemplary cluster architecture is described below with respect to FIGS. 13-14. However, the underlying principles of the invention are not limited to any particular application server architecture.

The applications servers 222-226 may include one or more dedicated Java Managed Bean (MBean or managed bean) servers having agent services. According to one embodiment, for and at each Java virtual machine (JVM) with managed resources, there may be one or more agents operating at the agent level 220. The one or more agents include one or more MBean servers, agent services, a set of MBeans, one or more connectors, and/or one or more protocol adaptors. An MBean Server includes a registry for MBeans and acts as a single entry point for calling MBeans in a uniform fashion from management applications at other JVMs.

The instrumentation level 230 provides a data storage medium for the JMA 200. As illustrated, according to one embodiment, the instrumentation level 230 includes one or more database management systems (DBMS) 232-234 and data sources 236-238. According to one embodiment, the data sources 236-238 may include databases and/or other systems capable of providing a data store. Furthermore, the instrumentation level 230 includes one or more hosts including one or more resources having MBeans, such as instrumentation MBeans. The instrumentation level 230 may make Java objects available to management applications 216. The Java objects instrumented according to the JMX-standard may include MBeans. The resources represented by MBeans include managed resources 240, including a kernel, a server component, or the like. MBeans may expose a management interface including constructors, attributes, operations, and notifications.

Figure 3:
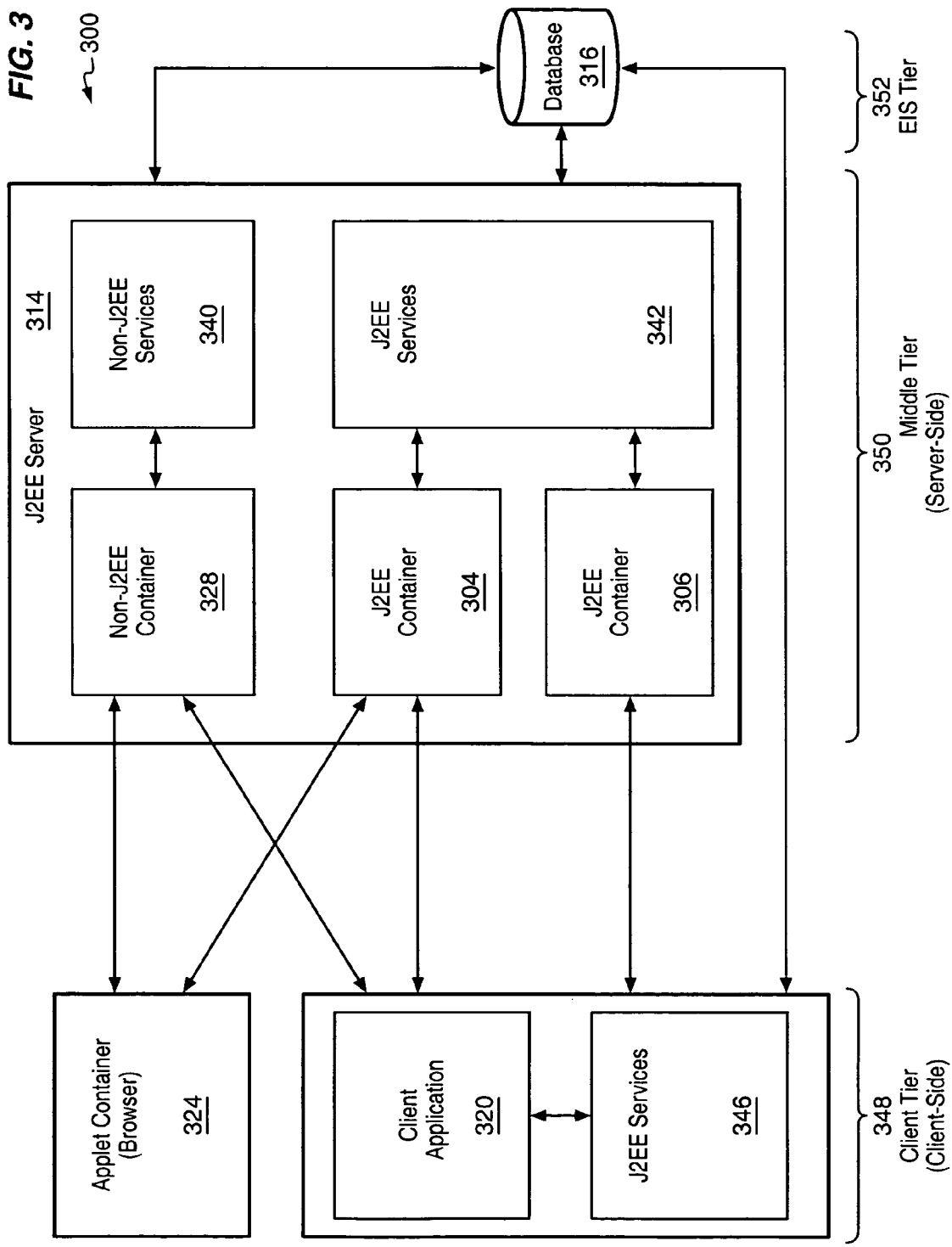
FIG. 3 is a block diagram illustrating an embodiment of a multi-tiered J2EE architecture having a J2EE server employing J2EE and non-J2EE containers and services.

FIG. 3 is a block diagram illustrating an embodiment of a multi-tiered J2EE architecture 300 having a J2EE server 314 employing J2EE and non-J2EE containers 304-306, 328 and services 340-342. As illustrated, the multi-tiered J2EE architecture 300 includes a J2EE server (or engine) 314 having J2EE containers 304-306 on the server-side, and more particularly, in the middle tier 350. The middle tier 350 of the J2EE server (or engine) 314 includes the presentation logic (e.g., Web tier) and business logic (e.g., business tier). Examples of the server-side J2EE containers 304-306 include Web containers and EJB containers. The client tier 348 includes a client application 320 to provide J2EE services 306. The client tier 348 may also include an applet container having a browser 324 to display information.

The J2EE containers 304-306 and the client application 320 are, directly or indirectly, in communication with the database 316, located at the Enterprise Information Systems (EIS) tier 352 of the multi-tiered J2EE architecture 300. The database 316 may include one or more database servers, EJB servers, old systems, and mySAP components. The client application 320 may include standard a J2EE application to help facilitate the running of applications in standalone JVMs. Furthermore, the clients may access one or more of the applications via standalone Java programs and programs that help access an application via, for example, using Internet Inter-Object Request Broker Protocol (IIOP)/Common Object Request Broker Architecture (COBRA) written using any programming language (e.g., –C, C, and C++).

The J2EE containers 304-306 in the middle tier 350 are associated with various J2EE services and APIs 342, examples of which, include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS), and dbpool service. The J2EE services 402 further include EJB_service, servlet_JSP, application_client_service, connector_service to provide (J2EE containers 304-306, namely) EJB containers, Web containers, application client containers, and connector containers, respectively. It is contemplated the client application 320 may also be associated with a set of J2EE services and APIs 346. However, each of the containers 304-306 may be associated with a different set of J2EE services. For example, on the client tier 348, the client application may be associated with different J2EE services 346 than the J2EE containers 304-306 associated with the J2EE services 342 on the server-side 350. Furthermore, the client-side 348 may or may not be J2EE-based.

According to one embodiment, as illustrated, the J2EE server 314 includes a non-J2EE container 328 and a set of non-J2EE services and interfaces 340. An example of a non-J2EE container 328 and non-J2EE services 340 may include an SAP container and a set of SAP services and APIs, respectively. The non-J2EE services 340 include Webdynpro service, log_configurator service, and monitoring service. According to one embodiment, non-J2EE components deployed in the non-J2EE container 328 may be used to assemble non-J2EE applications (e.g., SAP applications). In one embodiment, the management of the non-J2EE applications is performed during and after deployment, while the assembly of the non-J2EE applications is conducted prior to deployment. According to one embodiment, both the J2EE and non-J2EE containers 304-306, 328 may have access to the J2EE and non-J2EE services 340-342.

According to one embodiment, some of the non-J2EE services 340 may include parallel or similar services to the J2EE services 342. The container API may be used to facilitate registration, unregisteration, implementation, and management of not only the J2EE containers 304-306, but also one or more non-J2EE containers 328 on the J2EE server 314. Using a common container API, both the standard J2EE containers 304-306 and the non-J2EE containers 328 may be deployed on the server-side 350, and the J2EE server 314, as whole, regards them as the same. Stated differently, when deploying a non-J2EE container 328, the specific details in the implementation and logic of the non-J2EE container 328 may be kept hidden from the J2EE server 314 so all J2EE and non-J2EE containers 304-306, 328 are to be recognized and regarded the same way as part of the J2EE architecture 300.

The container API, according to one embodiment, is encapsulated in a service 340-342. This is to, for example, expand the J2EE architecture 300 to provide a relatively easy implementation and deployment of services, interfaces, and libraries, and to provide one or more non-J2EE containers 328, which in turn can deploy any non-J2EE components with relative ease using the same infrastructure. The container API may be represented by an interface defined as a development component with the name, e.g., <container_api>. The implementation of container API may be performed using the deploy service.

According to one embodiment, the deploy service may be used as an entry point for extending the J2EE architecture 300 and for enhancing the functionality of the J2EE engine 314 by deploying the non-J2EE containers 328 along with the J2EE containers 304-306. The deploy service may also be used for the deployment of applications, standalone modules (containing both J2EE and non-J2EE components), service, and libraries.

Figure 4:
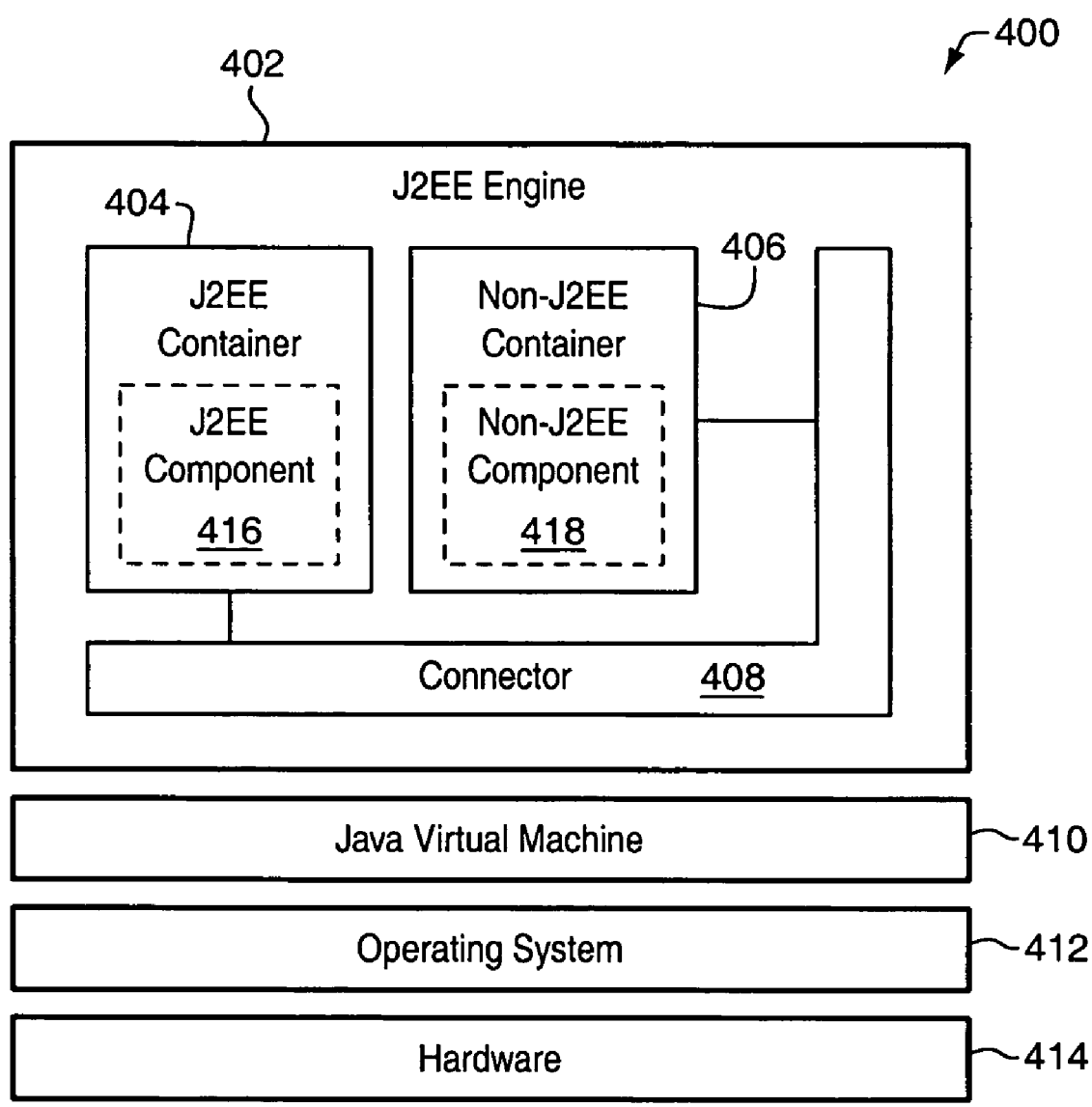
FIG. 4 is a block diagram illustrating a J2EE architecture having J2EE and non-J2EE containers residing on a J2EE engine.

FIG. 4 is a block diagram illustrating a J2EE architecture 400 having J2EE and non-J2EE containers 404-406 residing on a J2EE engine 402. In the illustrated embodiment, the J2EE engine (or server) 402 includes both a J2EE container 404 and a non-J2EE container 406. The J2EE container 404 manages a J2EE component 416, which may be part of a J2EE application. The non-J2EE container 406 manages a non-J2EE component 418, which may be part of a non-J2EE application. The term non-J2EE may refer to a non-J2EE standard element, such as a container 406, component 418, and application and may be synonymous with SAP AG.

The J2EE architecture 400 further includes connectors 408 to provide standard services and APIs to connect the J2EE server 402 and its elements with the rest of the J2EE architecture 400. The connectors 408 may be J2EE or non-J2EE based. The J2EE architecture 400 also includes a JVM 410 to process platform-independent bytecode into platform-specific native code or binary machine code at runtime. The binary machine codes are executed on a hardware 414 using an operating system 412. The operating system 412 may include Microsoft Windows®, Macintosh, Unix, Linux, and the like. The hardware 414 may include a computer processing unit, a storage device, a random access memory, and the like.

Figure 5:
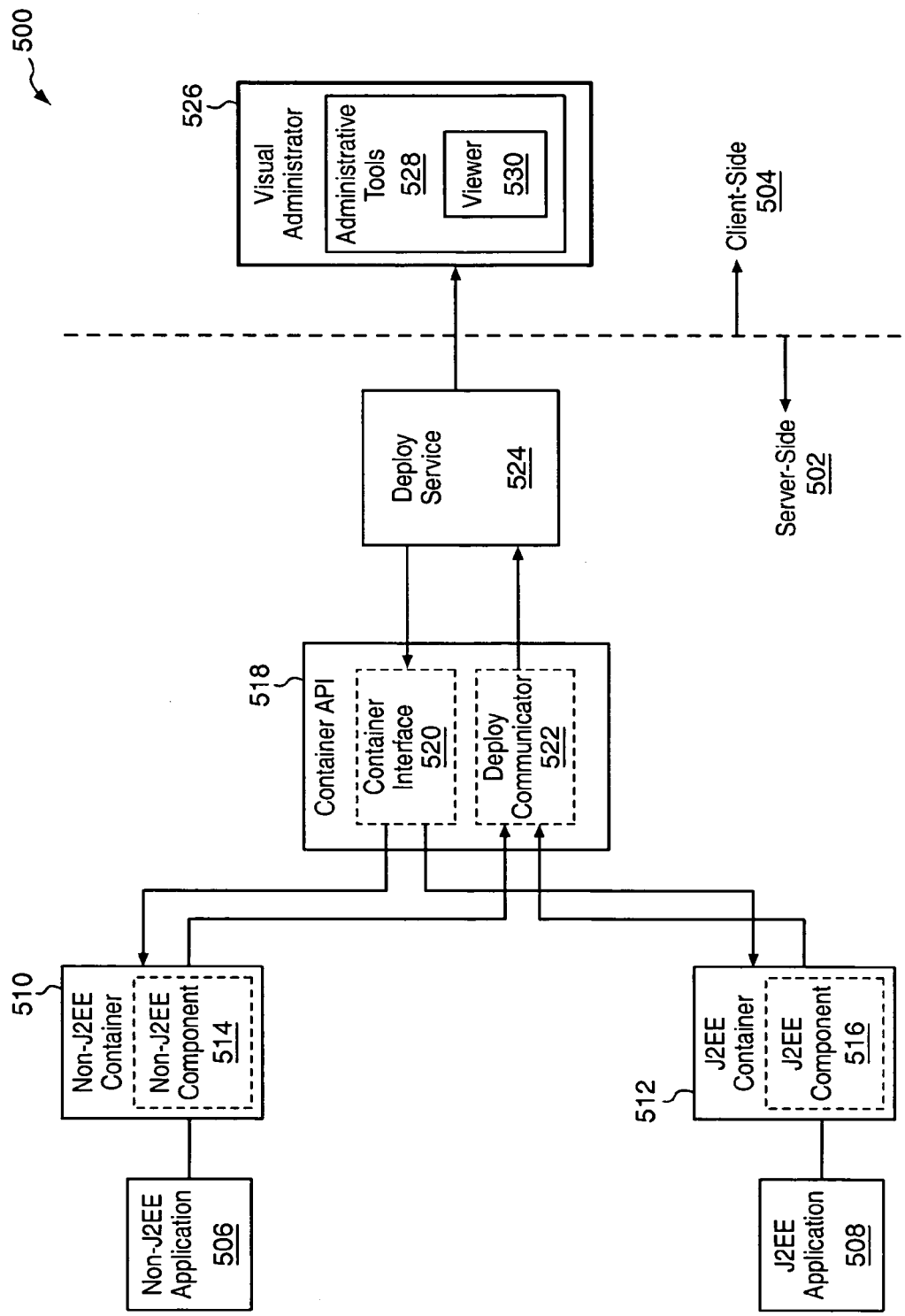
FIG. 5 is a block diagram illustrating a J2EE architecture having a deploy service.

FIG. 5 is a block diagram illustrating a J2EE architecture 500 having a deploy service 524. According to one embodiment, the deploy service 524 serves to extend and enhance the J2EE architecture 500 and its functionalities. The deploy service 524 along with the container API (e.g., SAP container API) 518 help facilitate the deploying of various deployable entities, including J2EE and non-J2EE components 514-516 using J2EE and non-J2EE containers 510-512, respectively. The container API 518 is represented on the server as an interface defined as a development component.

Serving as an entry point for expanding and enhancing the J2EE architecture 500, the deploy service 524 is also used for correct distribution of the deployable entities to their services/ containers and a storage place. The storage place is retrieved from configuration manager in the database and the deploy service 524 is to facilitate the storage of all applications so that the containers 510-512 may rely on a consistent storage for the entire application. The application components 514-516 and standalone modules are managed by the containers 510-512, the libraries, services, and interfaces are managed by server's deploy context, which is located at a deeper level in the core of the server because these deployable components are used by applications 506-508 found on a higher level in the J2EE architecture 500. Stated differently, deploy service 524 is used to manage an entire application 506-508, the container 510-512 is used to manage the applications' components 514-516, and the deploy context is used to manage the server components, such as the libraries, services and interfaces. According to one embodiment, the deploy service 524 may obtain the deploy context using its application service context.

According to one embodiment, the container API 518 provides a container interface 520 that is implemented by container services associated with the containers 510-512 (e.g., <com.sap.engine.services.deploy-.container.ContainerInterface>). Such implementation is to facilitate the deploy service 524 to identify and process various actions on those containers 510-512 that are implemented according to a set of rules including the implementation of the container API 518 by container services. A container service may listen for the availability of the container interface by implementing a container event listener (e.g., <com.sap.engine.frame.container.event.ContainerEventListener>).

The container API 518 provides a container management for registration of containers 510-512 by container services when an event indicating the availability of the container API 518 (e.g., <container_api>) is received or listened to by a container service via the container event listener. The container service may then register the container 510-512 using container management. In contrast, when a container 510-512 is rendered not available that container 510-512 is unregistered using the container management (e.g., <com.sap.engine.services.deploy.container.ContainerManagement>). Stated differently, the container services are provided with an opportunity to register their corresponding containers 510-512 with the container API 518 and the deploy service 524 when the continers 510-512 become available and are ready to to perform deployment operations. In contrast, the containers 510-512 may be unregsitered when once they stop or become unavailable.

According to one embodiment, the container API 518 also includes deploy communicator 522 in combination with the container interface 520. The availability of the deploy communicator 522 and the container interface 520 allows the deploy service 524 and the containers 510-512 to communicate bi-directionally. Stated differently, using the container interface 520, the information flows from the deploy service 524 to the containers 510-512. Each of the containers 510-512 may obtain an instance of the deploy communicator 522 during its registration to communicate back with the deploy service 524.

Using the deploy communicator 522, the information may flow from the containers to the deploy service 524. Such information may include information relating to the status, requesting runtime information, initiating operations from containers 510-512, etc., flowing back to the deploy service 524. Such information allows the deploy service 524 to be more efficient by, for example, allowing the containers 510-512 to request to lock the application or changes that may occur due to some property changes in the container 510-512, or by having the deploy service 524 request the changes by update. Another example includes allowing a container 510-512 to stop its deployed applications in the container service stop method, since applications are usually consisting of more than one component and the deploy service 524 may know the entire configuration of an application.

According to one embodiment, the instance of container information (e.g., <container info>) including information for identification of a container 510-512 may have a set of properties with set/get methods. Some of the properties include: (1) determination of whether a container 510-512 is a J2EE container 512 (e.g., EJB, Web, application, client, resource adapter) or a non-J2EE container 510 (e.g., SAP container); (2) for J2EE containers 512, specification of the type of the components 516 deployed (e.g., String j2eeModuleName); (3) for non-J2EE containers 510, specification of the type of the components 514 deployed (e.g., String moduleName); (4) for specification of the priority of a container 510-512 (e.g., when an application is being deployed, stopped, and started), the deploy service 524 knows in what order to notify the concerned containers 510-512. During deployment and start of an application, the containers 510-512 having higher priority are notified first, and during stop of an application the containers 510-512 with lower priority are first notified (e.g., int priority); (5) specification of a container's unique name (e.g., String name); (6) specification of a set of extensions of files which represents components 514-516 deployed on the respective containers 510-512 (e.g., String [] fileExtentions); (7) specification of a set of names of files which represent components 514-516 deployed on the respective containers 510-512 (e.g., String [] filenames); (8) specification of the name of the service that provides the container (e.g., String serviceName); (9) determination of whether the container 510-512 supports the operation "single file update" (e.g., Boolean supportsSingleFileUpdate); and (10) specification of the kind of resource types that are supported by the container (e.g., String [] resourceTypes).

According to one embodiment, filenames and extensions may be used by the deploy service 524 for distribution of the deployable components 514-516 on the containers 510-512. The deploy service 524 may include a mechanism for automatic recognition of the container 510-512 to which the corresponding deploying components 514-516 may be distributed, in accordance with the filenames and extensions contained in the <container info> of each of the containers 510-512. For example, if a standalone module file has an extension WebARchive (e.g., WAR or war) and the J2EE Web container has specified this extension in its <container info>, the deploy service 524 may distribute a WAR file to the Web container.

Figure 6:
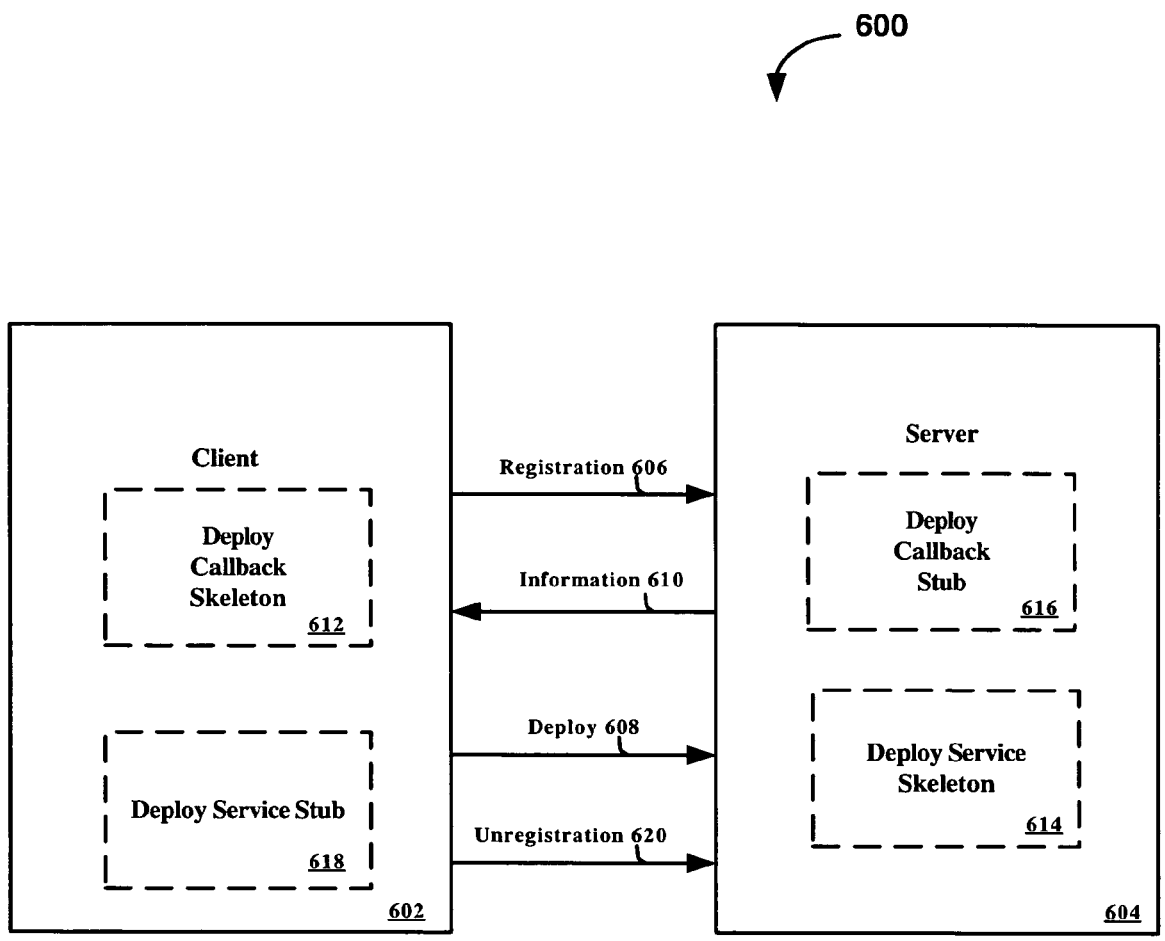
FIG. 6 is a block diagram illustrating an overview of a J2EE architecture having a deploy callback system.

FIG. 6 is a block diagram illustrating an overview of a J2EE architecture 600 having a deploy callback system. In the illustrated embodiment, the J2EE architecture 600 includes a client 602 in communication with a server 604. The communication between the client 602 and the server 604 is a bi-directional communication. The bidirectional communication may be facilitated by having a deploy service API and a deploy callback system. A deploy communicator may be used to facilitate communication between various containers and the deploy service.

For example, the client 602 may communicate with the server 604 to register 606 and deploy 608 the deploy callback components, such as a deploy listener, on the server 604. The server 604 then communicates information 610 regarding the deployment of the components back to the client 602. The client 602 may also unregister 620 the deploy callback components. According to one embodiment, using the bidirectional communication and the deploy service, a stub, such as a deploy callback stub 616, from the client 602 may be implemented on the server 604 to have the server 604 act as a client. However, the client 612 may still include other stubs, such as the deploy service stub 618, and the server 604 includes its skeletons, such as the deploy service skeleton 614. The client 602 may have a deploy callback skeleton 612. A stub is typically generated on the client 602 using a compiler (e.g., idltojava), which works as the basis for a client application and for building the client code. Similarly, a skeleton is typically generated on the server 604 using a compiler (e.g., idltojava) to put together a server application and to build the server code. A stub refers to reference on the client-side used by a protocol to perform a task on the skeleton on the server-side.

Figure 7:
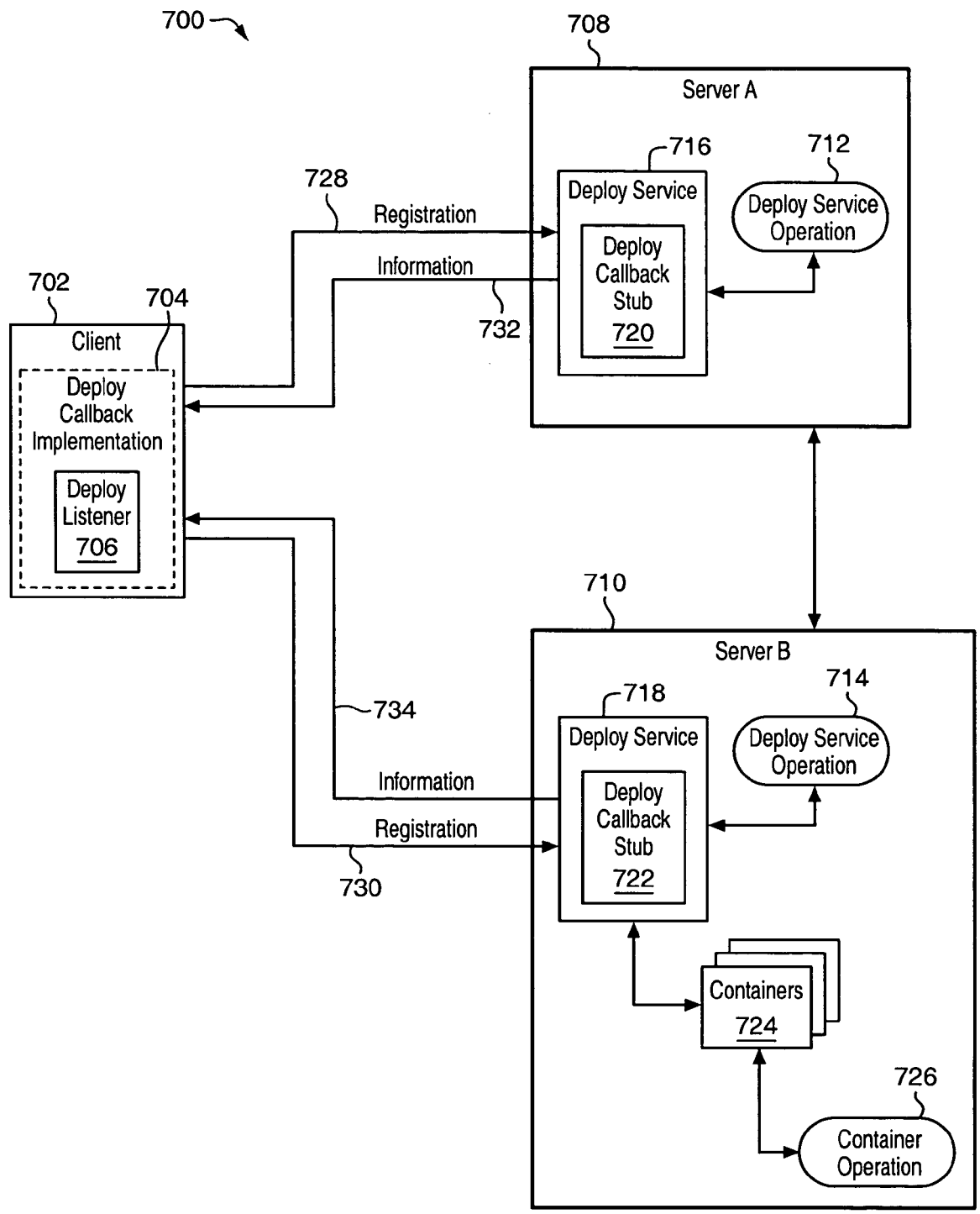
FIG. 7 is a block diagram illustrating an embodiment of a J2EE architecture having a deploy callback system.

FIG. 7 is a block diagram illustrating an embodiment of a J2EE architecture having a deploy callback system 700. As illustrated, the J2EE architecture includes a client 702 and a cluster of servers 708-710. It is contemplated, the number of clients 702 and servers 708-710 may vary from one to several in one or more clusters. In one embodiment, the deploy callback system 700 is part of the deploy service 716-718 on the servers 708-710. The client 702, according to one embodiment, includes a deploy callback implementation (or API) 704 for implementing one or more deploy listeners 706. A deploy listener 706 may be used for listening the start and end of various deploy operations or container operations 726 that are executed on containers 724 on the server 710. Similarly, the deploy listener 706 may be used for listening the start and end operations related to the entire application (e.g., deploy service operations 712-714) that are also executed on servers 708-710.

According to one embodiment, the deploy callback implementation 704 (e.g. <com.sap.engine.services.deploy.DeployCallbackImpl>) may contain methods for registration and unregistration of the deploy listener 706 (e.g., <DeployListener>). The deploy listener 706 may be implemented using a module as part of the deploy callback system 700. The methods of the deploy listener 706 and the deploy callback API 704 may receive information or deploy event 732-734 (e.g., <com.sap.engine.services.deploy.DeployEvent>) which may represent information relating to the deploy services operations 712-714 and container operation 726 including, for example, the start and end of various operations, on a server 708-710 or in a cluster of servers.

Using deploy callback stubs 720-722, continuous information 732-734 may be provided over the current processes performed over applications by deploy service 716-718 (e.g., deploy service operations 712-714) and the containers 724 (container operation 726). The deploy service operations 712-714 may refer to application deployment-related information that relates to the management of the application as a whole. The container operation 726 may refer to information relating to various deploy operations, such as deployment, stop, start, update, and remove, relating to the components associated with the application.

The deploy callback system 700 provides methods for handling events of applications, libraries, and reference changes. For example, when a tool on the client 702 that uses the deploy service 716-718 performs an operation over an application and requests events or information about the status of the operation, it first implements a deploy listener 706 using the deploy callback API 704. Once the deploy listener 706 is implemented, the registration 728-730 of the deploy listener 706 is communicated to the deploy service 716-718 via a deploy service stub. The deploy service 716-718, via the deploy callback stub 720, provides the information 732-734 relating to deploy service operations 712-714 and container operation 724 to the deploy listener 706 associated with the client 702.

According to one embodiment, the deploy listener 706 may be registered 728-730 using a deploy callback module, represented with a deploy callback API 704 that may be accessed by a deploy service API. It is contemplated, one deploy callback stub 720-722 may help provide information 732-734 to a number of deploy listeners 706. The implementation of the sub provides a deploy callback stub 720-722 on the server 708-710 and helps avoid the typical stub/skeleton problems. In one embodiment, a deploy listener 706 may be unregistered 728-730 to block the information 732-734 from being received. In another embodiment, a filter may be implemented to facilitate filtering of the information 732-734 received by the deploy listener 706.

Examples of the fields of the deploy events or operations, which may be obtained by get methods, include action_start, action_finish, local_action_start, local_action_finish. The local phases represent the beginning and ending of an operation on 1 cluster node, while the non-local phases represent the beginning and ending of the operation in the entire cluster. Other action types include deploy_app, deploy_lib, remove_lib, deploy_lang_lib, make_refs, remove_refs, update_app, remove_app, stop_app, start_app, runtime_changes, single_file_update, add_app_info_change. In terms of component names, string refers to returning the name of the component involved in the action (e.g., <string>). Its type might be application, library, and the like, and may be defined by methods in deploy listener 706. With regard to errors, string refers to returning errors occurred during execution of current action (e.g., <string[ ]>). For message, string refers to returning short message describing the action represented by this event (e.g., <string>). String may also be used for referring to returning the name of the server initiating the action represented by an event in case of a server (e.g., <string>), and referring to warnings occurred during execution of current action in regards to warnings (e.g., <string[ ]>).

Figure 8:
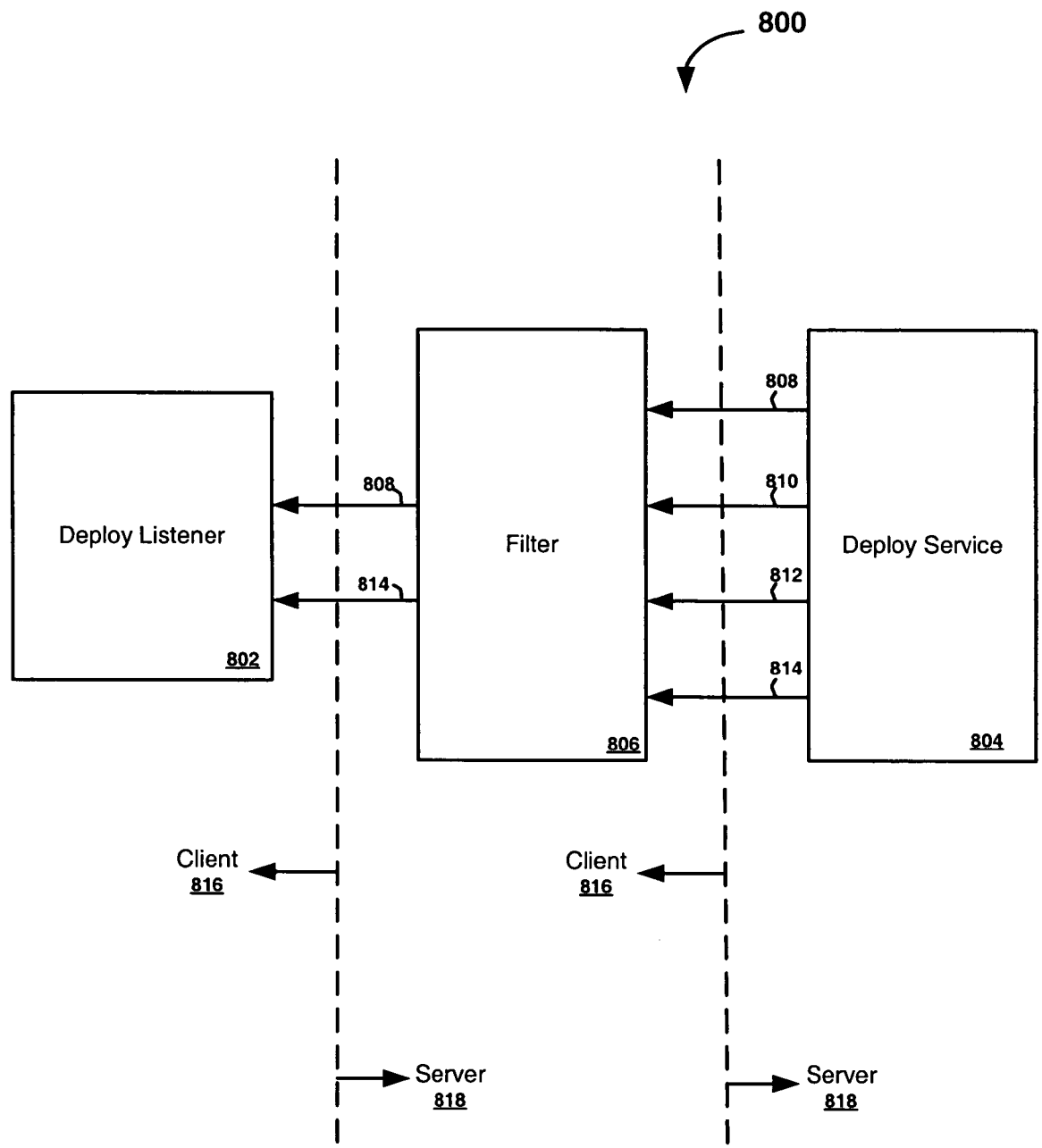
FIG. 8 is a block diagram illustrating an embodiment of a deploy callback system having a filter.

FIG. 8 is a block diagram illustrating an embodiment of a deploy callback system 800 having a filter 806. In the illustrated embodiment, information 808-814 is provided by the deploy service 804 using a deploy callback stub to the deploy listener 802. The information 808-814, for example, may include status information (or events) regarding various deploy operations, such as stop 808, start 810, update 812, and remove 814, from containers. According to one embodiment, the client, using the deploy listener 802, may be registered to receive all of the information 808-814.

According to another embodiment, a filter 806 may be implemented in the deploy callback system 800 to filter or block certain information 808-814 from reaching the deploy listener 802. For example, as illustrated, the status information regarding the deploy operations start 810 and update 812 is filtered out or blocked from reaching the client via the deploy listener 802. The deploy listener 802, in the illustrated embodiment, receives the status information regarding deploy operations stop 808 and remove 814. It is contemplated, a filter 806 may be implemented using a deploy callback module and a deploy callback API on the client 816 and/or on the server 818.

Figure 9:
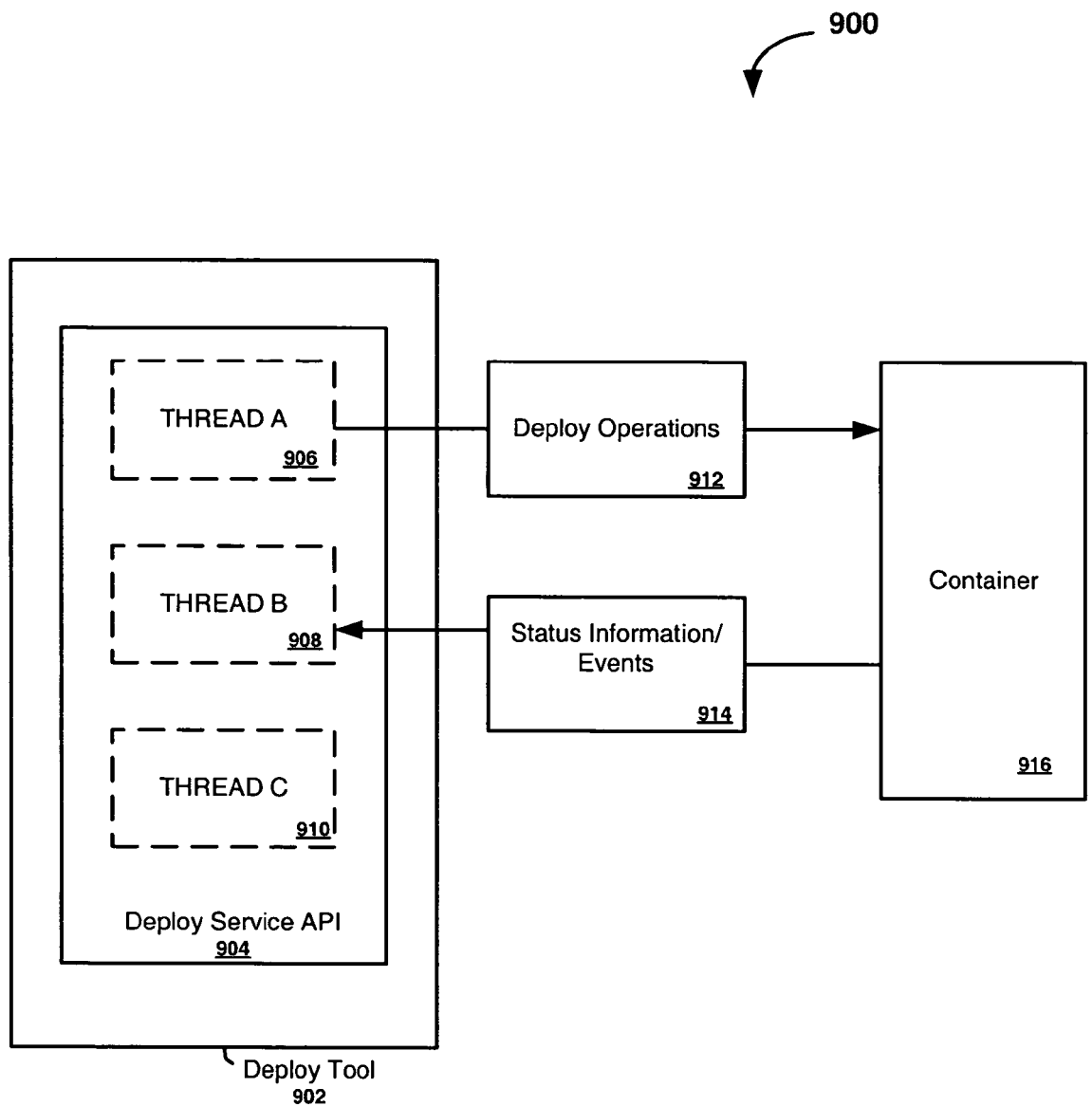
FIG. 9 is a block diagram illustrating a deploy callback system having multiple threads.

FIG. 9 is a block diagram illustrating a deploy callback system 900 having multiple threads 906-910. In the illustrated embodiment, the deploy tool 902 includes multiple threads 906-910 to perform multiple system tasks simultaneously. The deploy tool 902 may include a GUI tool to, for example, generate and assemble archive components, to provide access to system resources to the user, and to facilitates deployment of applications and components on a J2EE engine. For example, the deploy tool 902 is used to create J2EE components out of existing class files and deployment descriptors, to assemble these components in an application Enterprise ARchive (EAR or ear) file, to edit its deployment properties, and to deploy the ear file on a specified SAP J2EE engine cluster elements. The deploy tool 902 may be part of a visual administrator on the client-side having a console window to display the status information/events 914 and errors messages.

According to one embodiment, the deploy tool 902 may provide multiple threads 902 using a deploy services API 904 to help avoid the blocking of the deploy tool 902 when running long and complex deploy operations, such as deployment, stop, start, update, and remove. For example, as illustrated, thread A 906 is used for deployment of an application and for the execution of corresponding deploy operations 912, while thread B 908 is used to receive status information 914 relating to such deploy operations 912. By separating the executions of deploy operations 912 and receiving of the status information 914, both tasks may be performed simultaneously, resulting in a more efficient system. Furthermore, using two threads A-B 906-908, the status information 914 may be continuously provided to the deploy tool which may include a deploy listener. Stated differently, continuous status information 914 may be provided to the client from a container 916 using one thread B 908, while various deploy operations 912 (for which the status information 914 is being provided) are performed on the container 916 using another thread A 906. The deploy tool 902 may include several other threads, such as thread C 910, to perform other system or deployment related tasks.

Figure 10:
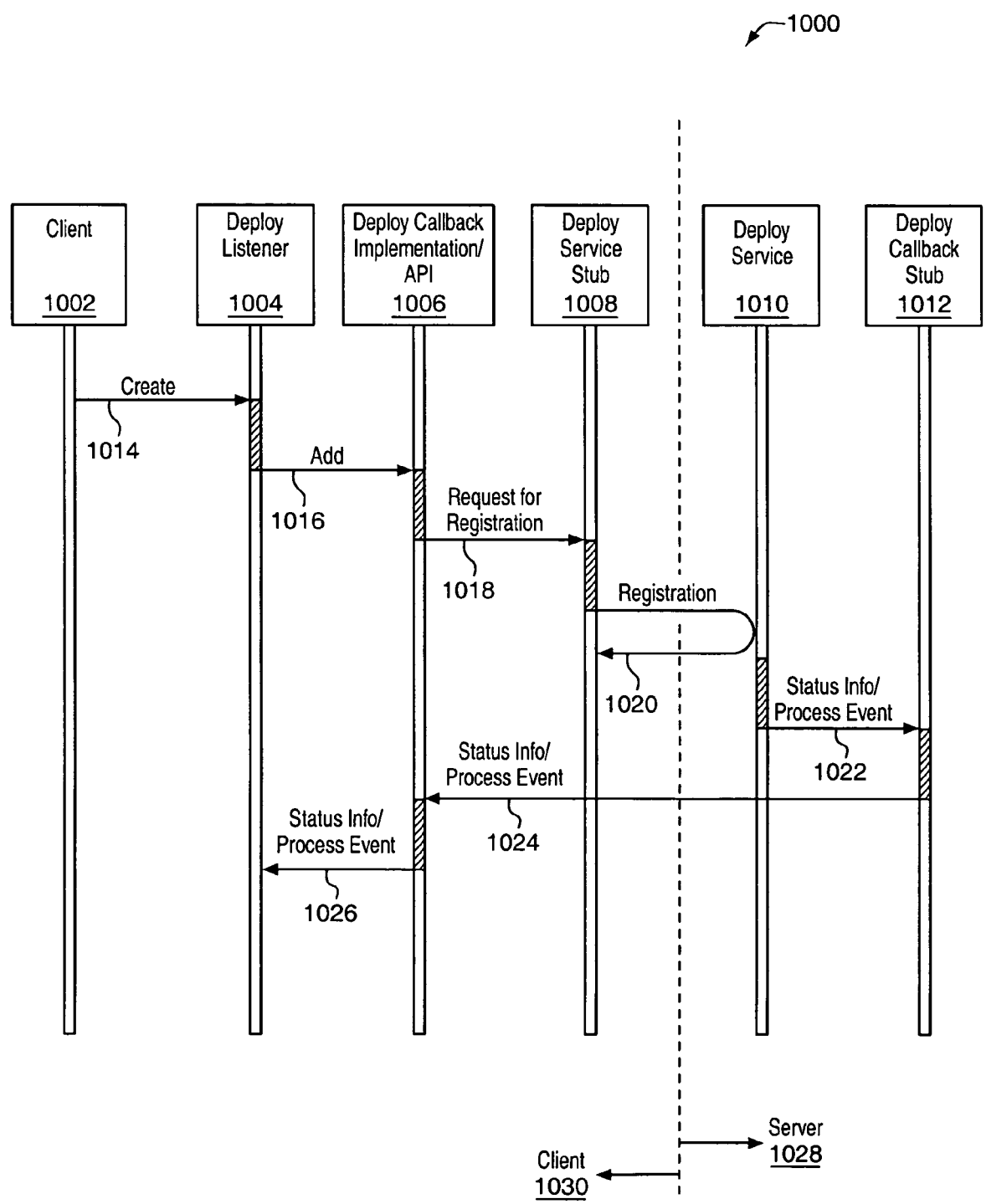
FIG. 10 is a block diagram illustrating an embodiment of an information transmission sequence for application deployment using a deploy callback system.

FIG. 10 is a block diagram illustrating an embodiment of an information transmission sequence for application deployment using a deploy callback system 1000. In the illustrated embodiment, using a deploy tool, a client 1002 creates 1014 a deploy listener 1004 to be added 1016 using a deploy callback implementation/API 1006. A notification or request for registration 1018 is filed with a deploy services stub 1008 using the deploy callback API 1006. The registration 1020 may be performed with communication between the deploy service stub 1008 and the deploy service 1010 on the server 1028. The registration 1020 may refer to the indication that a deploy listener 1004 is available for listening and that a deploy callback stub 1012 resides on the server 1028 to direct the status information or event process 1024-1026 from the server 1028 to the client 1030. Once the deploy registration 1020 is completed, the deploy listener 1004 may be ready to listen or receive status information or event process 1026, via the deploy callback stub 1012, from the deploy service 1010 regarding the deployment of the application.

Figure 11:
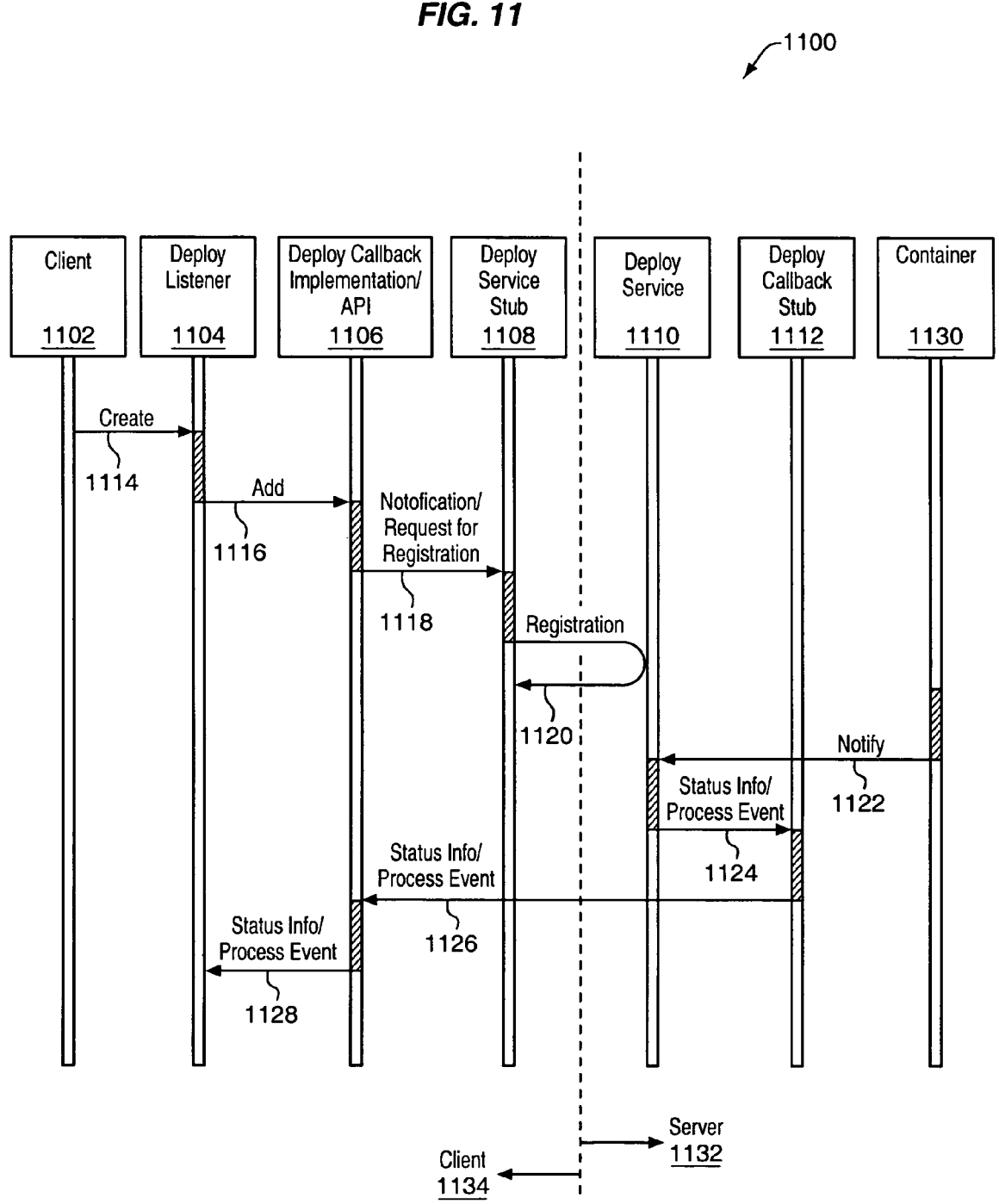
FIG. 11 is a block diagram illustrating an embodiment of an information transmission sequence for deploy operations using a deploy callback system.

FIG. 11 is a block diagram illustrating an embodiment of an information transmission sequence for deploy operations using a deploy callback system 1100. As with reference to operations in deploy service, described with reference to FIG. 10, a deploy listener 1104 is created 1114. The deploy listener 1104 may also be used to listen or receive status information or events 1126 for container operations from the container 1130 via the deploy callback stub 1112. The container operations include deploy operations, such as deploy, stop, start, update, and remove, performed in the container 1130 relating to application deployment.

According to one embodiment, once the registration 1120 is completed, all the notifications 1122 from container 1130 to the deploy service 1110 of the state of the deploy operations are registered. The deploy service 1110 may then provide status information or process event 1124 via the deploy callback stub 1112. The deploy callback stub 1112 forwards the status information 1126 to the deploy callback API 1106 and, via the deploy callback 1106, the status information 1128 is provided to the deploy listener 1104.

Figure 12:
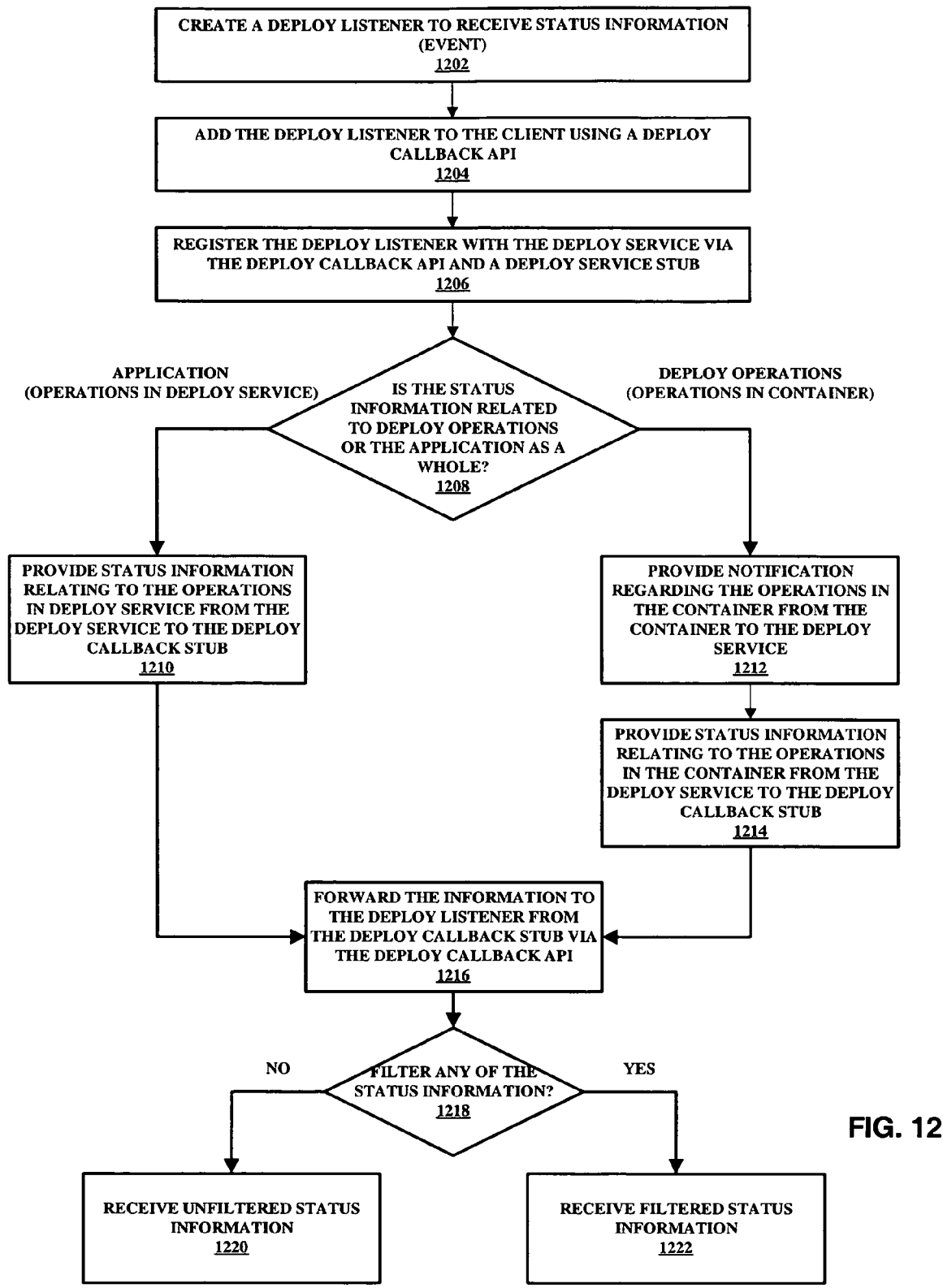
FIG. 12 is a flow diagram illustrating an embodiment of a process for implementing a deploy listener and for receiving status information using the deploy listener in a deploy callback system.

FIG. 12 is a flow diagram illustrating an embodiment of a process for implementing a deploy listener and for receiving status information using the deploy listener in a deploy callback system. First, according to one embodiment, a deploy listener is created to be implemented on a client at processing block 1202. The deploy listener may be used to receive or listen to status information or event relating to deployment of an application, as a whole, or relating to various deploy operations associated with the deployment of the application. The deploy listener may then be added to the client using a deploy callback implementation or API at processing block 1204. The new deploy listener is then registered with the deploy service via the deploy callback API and a deploy service stub at processing block 1206.

According to one embodiment, once the deploy listener is created on the client and registered with the deploy service, using the deploy callback API, the deploy listener is considered ready to receive and listen to the status information or event relating to the deployment of an application and to various deploy operations, such as deployment, stop, start, remove and update, associated with the deployment of the application. At decision block 1208, a determination is made as to whether the deploy listener has requested status information relating to the deployment of the application (e.g., operations in deploy service) or relating to the deploy operations (e.g., operations in container) associated with the deployment of the application.

In one embodiment, if request for operations in deploy service was made, the corresponding status information is provided from the deploy service to the deploy callback stub at processing block 1210. In another embodiment, if the request for operations in container is made, a notification of the corresponding status information is provided from the container, in which the particular deploy operation is being performed, to the deploy service at processing block 1212. The status information about operations in container may then be provided from the deploy service to the deploy callback stub at processing block 1214. In either case (e.g., operations in deploy service or operations in container), the status information may then be forwarded from the deploy callback stub to the deploy listener via one or more interfaces, such as the deploy callback API, at processing block 1216.

According to one embodiment, a filter may be implemented a part of the deploy service on the client and/or the server. The filter is used to filter or block part of the status information not requested or required by the deploy listener. At decision block 1218, a determination is made as to whether the deploy listener has requested filtering of any of the status information. If yes, the deploy listener receives filtered status information at processing block 1222. If not, the deploy listener receives unfiltered status information at processing block 1220.

Figure 13:
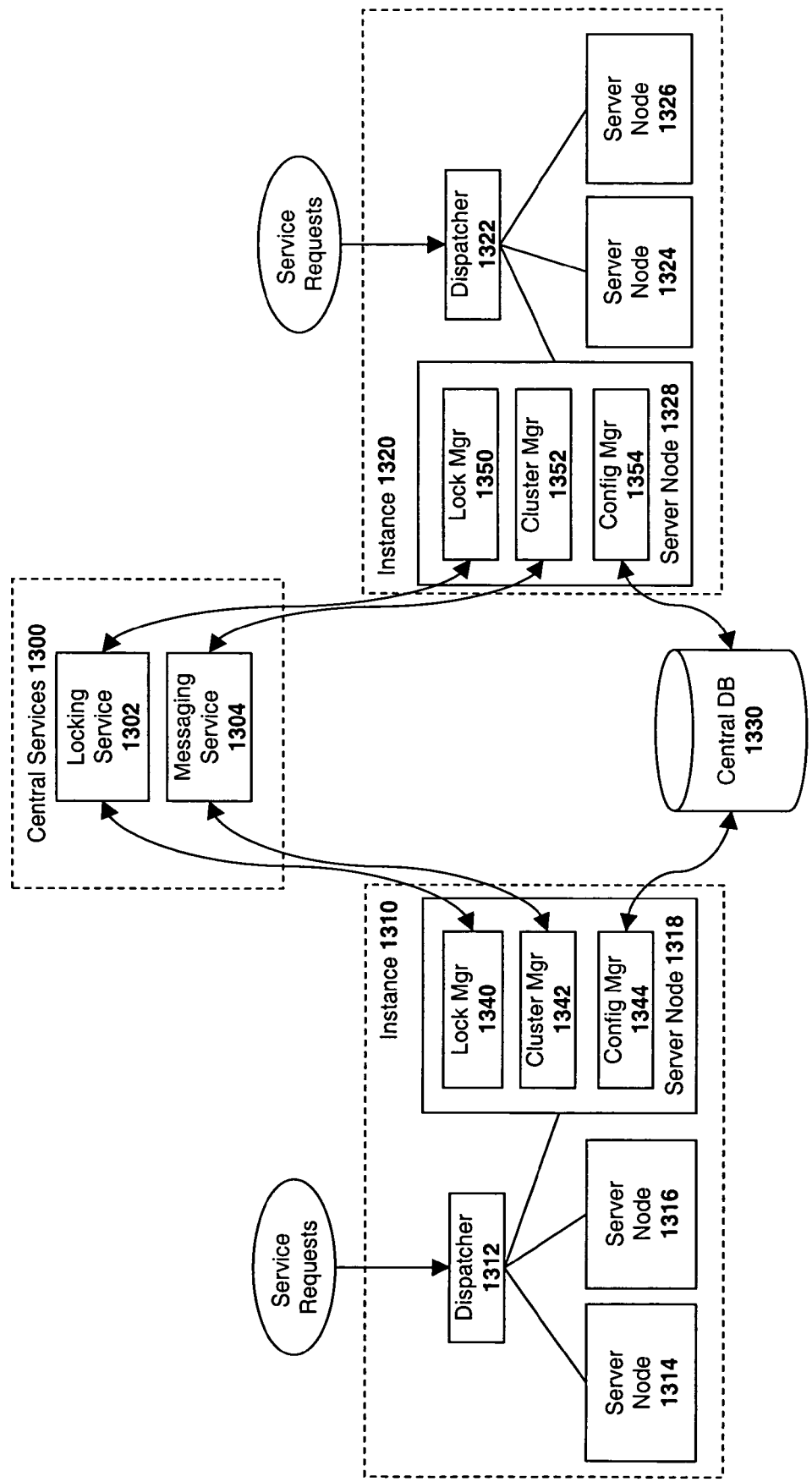
FIG. 13 is a block diagram illustrating an embodiment of a server node system architecture.

A system architecture according to one embodiment of the invention is illustrated in FIG. 13. The architecture includes a central services instance 1300 and a plurality of application server instances 1310, 1320. As used herein, the application server instances, 1310 and 1320, each include a group of server nodes 1314, 1316, 1318 and 1324, 1326, 1328, respectively, and a dispatcher, 1312, 1322, respectively. The central services instance 1300 includes a locking service 1302 and a messaging service 1304 (described below). The combination of all of the application server instances 1310, 1320 and the central services instance 1300 is referred to herein as a "cluster." Although the following description will focus solely on instance 1310 for the purpose of explanation, the same principles apply to other instances such as instance 1320.

The server nodes 1314, 1316, 1318 within instance 1310 provide the business and/or presentation logic for the network applications supported by the system. Each of the server nodes 1314, 1316, 1318 within a particular instance 1310 may be configured with a redundant set of application logic and associated data. In one embodiment, the dispatcher 1310 distributes service requests from clients to one or more of the server nodes 1314, 1316, 1318 based on the load on each of the servers. For example, in one embodiment, the dispatcher 1310 implements a round-robin policy of distributing service requests.

The server nodes 1314, 1316, 1318 may be J2EE server nodes which support EJB components and EJB containers (at the business layer) and Servlets and JSP (at the presentation layer). Of course, the embodiments of the invention described herein may be implemented in the context of various different software platforms including, by way of example, Microsoft .NET platforms and/or the ABAP platforms developed by SAP AG, the assignee of the present application.

In one embodiment, communication and synchronization between each of the instances 1310, 1320 is enabled via the central services instance 1300. As illustrated in FIG. 13, the central services instance 1300 includes a messaging service 1304 and a locking service 1302. The message service 1304 allows each of the servers within each of the instances to communicate with one another via a message passing protocol. For example, messages from one server may be broadcast to all other servers within the cluster via the messaging service 1304 (e.g., such as the cache configuration messages described below). Alternatively, messages may be addressed directly to specific servers within the cluster (i.e., rather than being broadcast to all servers).

In one embodiment, the locking service 1302 disables access to (i.e., locks) certain specified portions of configuration data and/or program code stored within a central database 1330 or resources shared in the cluster by different services. The locking manager locks data on behalf of various system components which need to synchronize access to specific types of data and program code (e.g., such as the configuration managers 1344, 1354). As described in detail below, the locking service enables a distributed caching architecture for caching copies of server/dispatcher configuration data.

In one embodiment, the messaging service 1304 and the locking service 1302 are each implemented on dedicated servers. However, the messaging service 1304 and the locking service 1302 may be implemented on a single server or across multiple servers while still complying with the underlying principles of the invention.

As illustrated in FIG. 13, each server node (e.g., 1318, 1328) includes a lock manager 1340, 1350 for communicating with the locking service 1302; a cluster manager 1342, 1352 for communicating with the messaging service 1304; and a configuration manager 1344, 1354 for communicating with a central database 1330 (e.g., to store/retrieve configuration data as described herein). Although the lock manager 1340, 1350, cluster manager 1342, 1352 and configuration manager 1344, 1354 are illustrated only with respect to server nodes 1318 and 1328 in FIG. 13, each of the server nodes 1314, 1316, 1324 and 1326 and/or on the dispatchers 1312, 1322 may be equipped with equivalent lock managers, cluster managers and configuration managers while still complying with the underlying principles of the invention.

Figure 14:
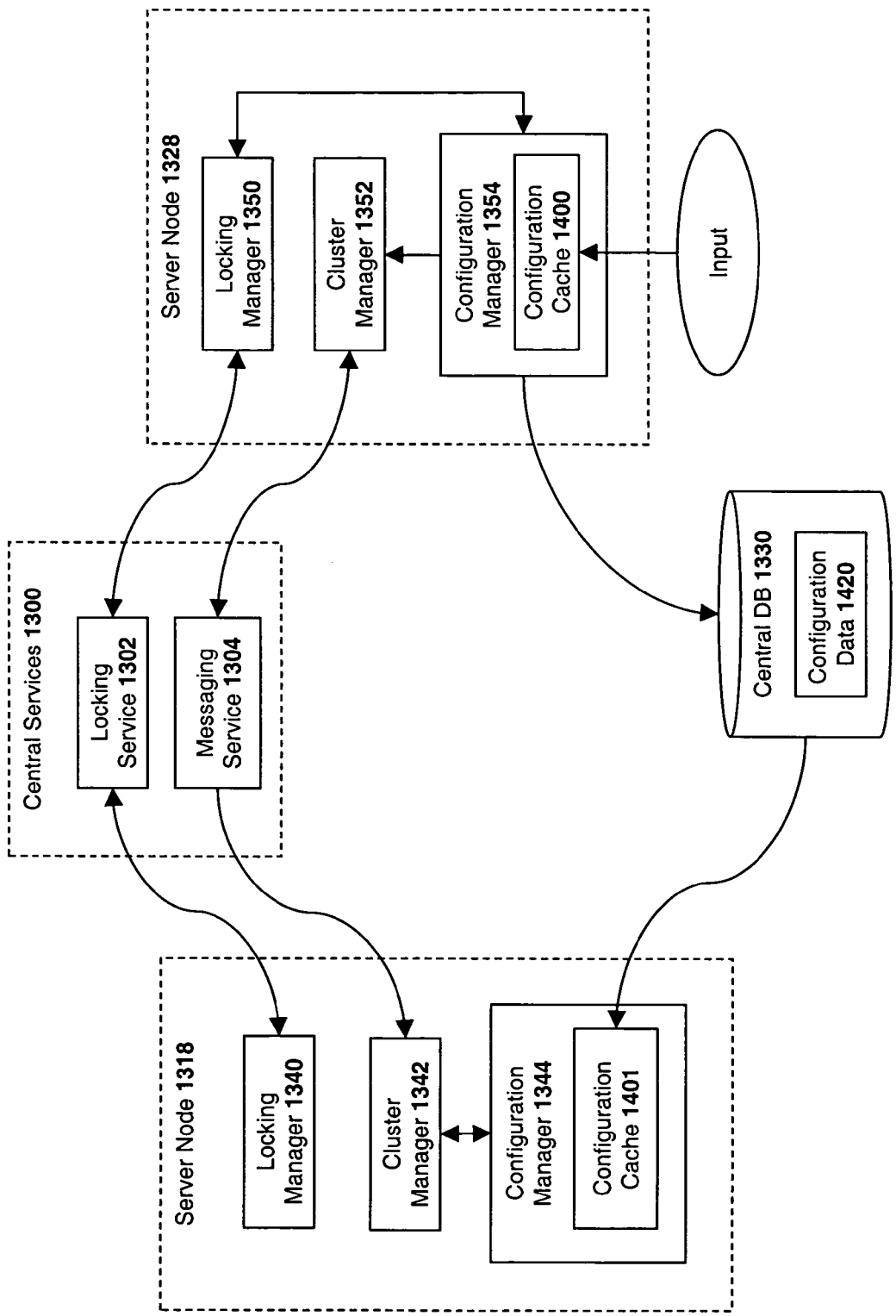
FIG. 14 is a block diagram illustrating an embodiment of a server node architecture which employs a configuration data caching.

Referring now to FIG. 14, in one embodiment, configuration data 1420 defining the configuration of the central services instance 1300 and/or the server nodes and dispatchers within instances 1310 and 1320, is stored within the central database 1330. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1344, 1354 cache configuration data locally within configuration caches 1400, 1401. As such, to ensure that the configuration data within the configuration caches 1400, 1401 remains up-to-date, the configuration managers 1344, 1354 implement cache synchronization policies, as described herein.

Figure 15:
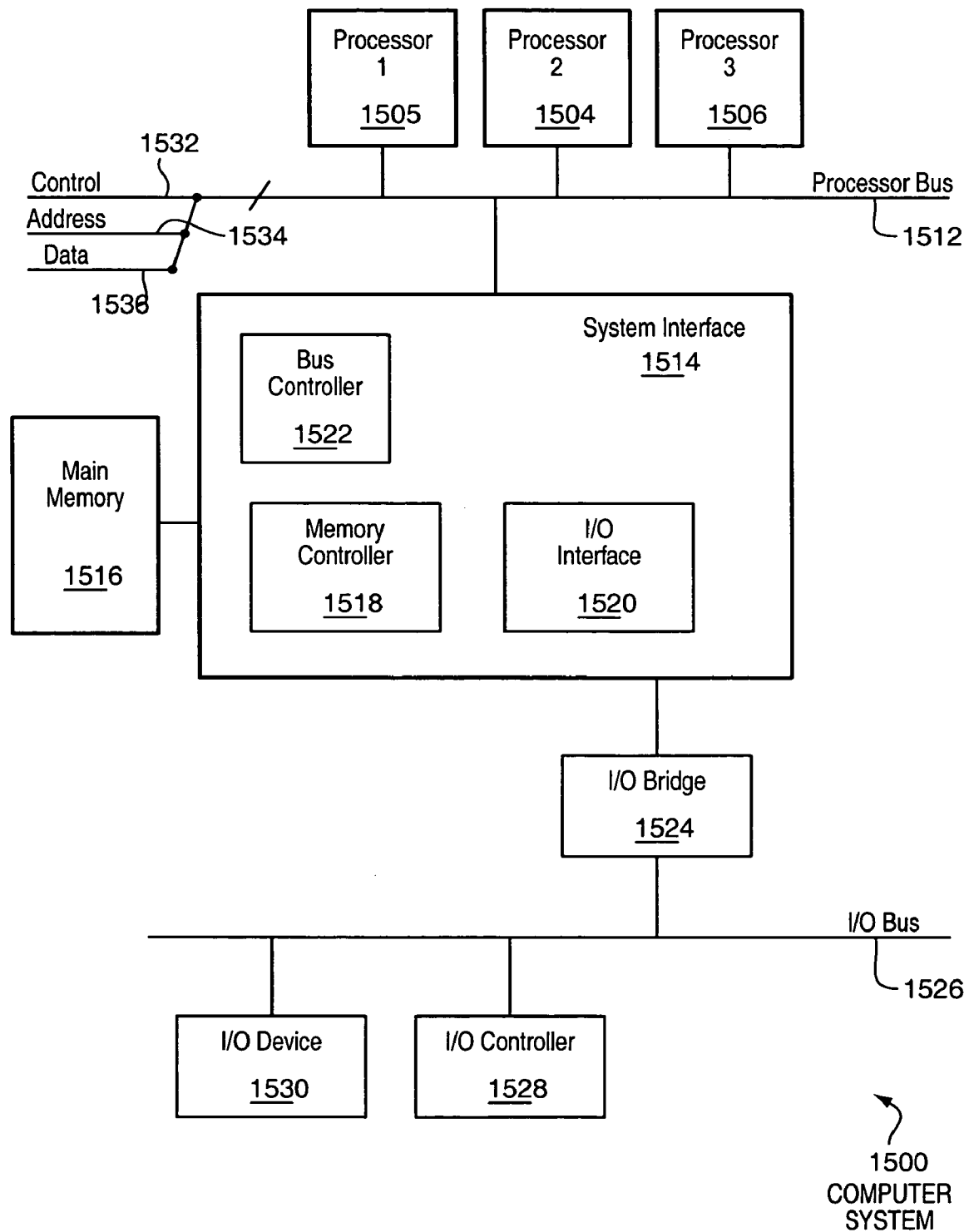
FIG. 15 is an exemplary computer system used for implementing an embodiment of the present invention.

FIG. 15 is an exemplary computer system 1500 used in implementing an embodiment of the present invention. The computer system (system) 1500 includes one or more processors 1502-1506. The processors 1502-1506 may include one or more single-threaded or multi-threaded processors. A typical multi-threaded processor may include multiple threads or logical processors, and may be capable of processing multiple instruction sequences concurrently using its multiple threads. Processors 1502-1506 may also include one or more internal levels of cache (not shown) and a bus controller or bus interface unit to direct interaction with the processor bus 1512.

Processor bus 1512, also known as the host bus or the front side bus, may be used to couple the processors 1502-1506 with the system interface 1514. Processor bus 1512 may include a control bus 1532, an address bus 1534, and a data bus 1536. The control bus 1532, the address bus 1534, and the data bus 1536 may be multidrop bi-directional buses, e.g., connected to three or more bus agents, as opposed to a point-to-point bus, which may be connected only between two bus agents.

System interface 1514 (or chipset) may be connected to the processor bus 1512 to interface other components of the system 1500 with the processor bus 1512. For example, system interface 1514 may include a memory controller 1518 for interfacing a main memory 1516 with the processor bus 1512. The main memory 1516 typically includes one or more memory cards and a control circuit (not shown). System interface 1514 may also include an input/output (I/O) interface 1520 to interface one or more I/O bridges or I/O devices with the processor bus 1512. For example, as illustrated, the I/O interface 1520 may interface an I/O bridge 1524 with the processor bus 1512. I/O bridge 1524 may operate as a bus bridge to interface between the system interface 1514 and an I/O bus 1526. One or more I/O controllers and/or I/O devices may be connected with the I/O bus 1526, such as I/O controller 1528 and I/O device 1530, as illustrated. I/O bus 1526 may include a peripheral component interconnect (PCI) bus or other type of I/O bus.

System 1500 may include a dynamic storage device, referred to as main memory 1516, or a RAM, or other devices coupled to the processor bus 1512 for storing information and instructions to be executed by the processors 1502-1506. Main memory 1516 also may be used for storing temporary variables or other intermediate information during execution of instructions by the processors 1502-1506. System 1500 may include a ROM and/or other static storage device coupled to the I/O bus 1526 for storing static information and instructions for the processors 1502-1506.

Main memory 1516 or dynamic storage device may include a magnetic disk or an optical disc for storing information and instructions. I/O device 1530 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 1530 may also include an input device (not shown), such as an alphanumeric input device, including alphanumeric and other keys for communicating information and/or command selections to the processors 1502-1506. Another type of user input device includes cursor control, such as a mouse, a trackball, or cursor direction keys for communicating direction information and command selections to the processors 1502-1506 and for controlling cursor movement on the display device.

System 1500 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 1500 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 200 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 16:
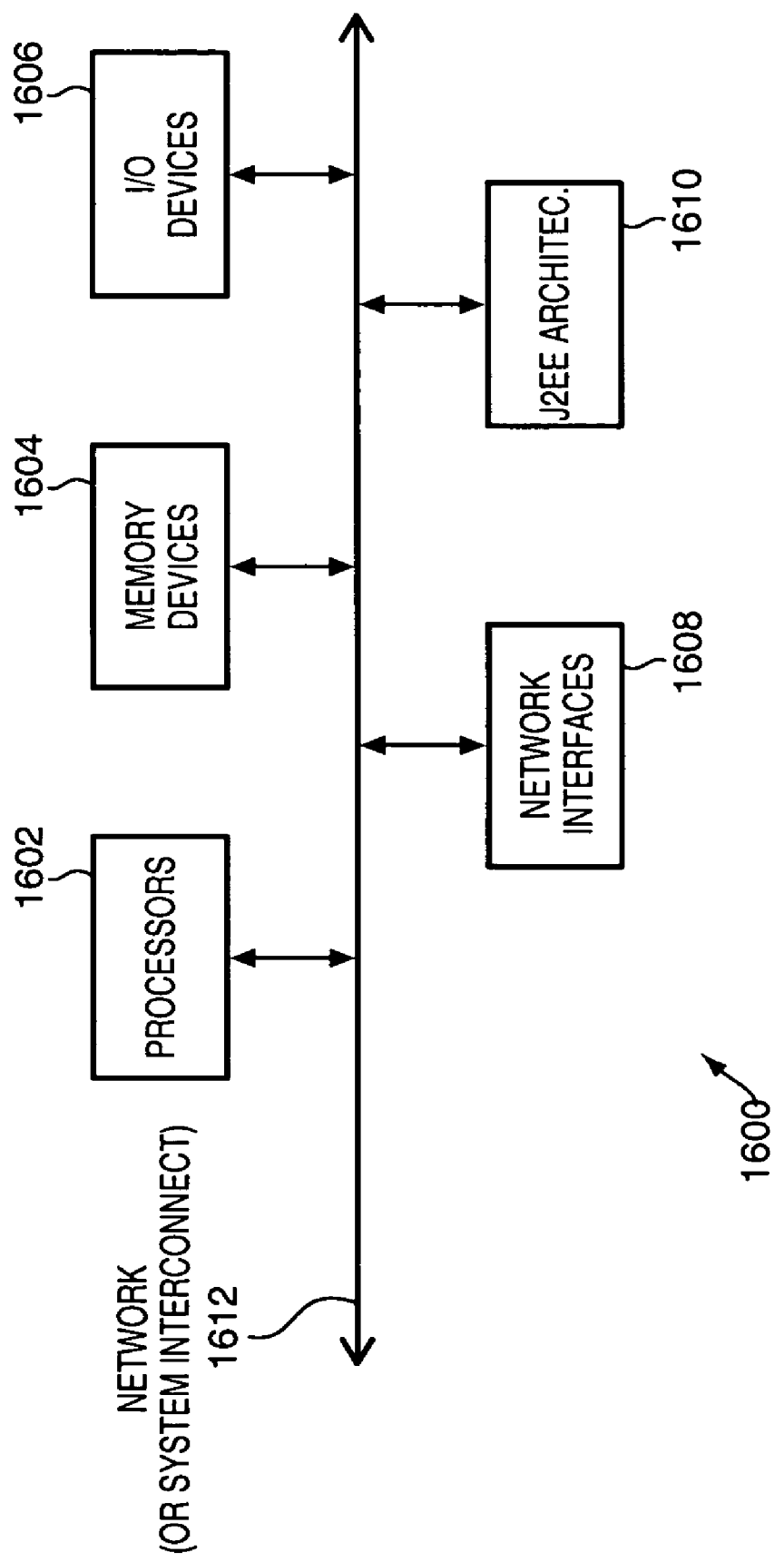
FIG. 16 is a block diagram illustrating an embodiment of a node implementation in a network.

FIG. 16 is a block diagram illustrating an embodiment of a node 1600 implementation in a network. According to one embodiment, the node 1600 may include one or more processors 1602 (e.g., processors 1502-1506 of FIG. 15), one or more memory devices 1604 (e.g., main memory 1516 of FIG. 15), one or more Input/Output (I/O) devices 1606 (e.g., I/O devices 1530 of FIG. 15), one or more network interfaces 1608, and J2EE architecture 1610, directly or indirectly, connected together and in communication with the network through a system or network interconnect 1612. The processors 1602 may include microprocessors, microcontrollers, FPGAs, ASICs, central processing units (CPUs), programmable logic devices (PLDs), and similar devices that access instructions from a system storage (e.g., memory 1604), decode them, and execute those instructions by performing arithmetic and logical operations.

The J2EE architecture 1610 may include a deploy callback system based on various J2EE and non-J2EE containers, components, resources, services, and interfaces. The J2EE and non-J2EE components may include executable content, control logic (e.g., ASIC, PLD, FPGA, etc.), firmware, or some combination thereof, in one embodiment of the present invention. In embodiments of the invention in which the J2EE architecture 1610 may include executable content, it may be stored in the memory device 1604 and executed by the control processor 1602.

Memory devices 1604 may encompass a wide variety of memory devices including ROM, EPROM, EEPROM, RAM, non-volatile random access memory (NVRAM), cache memory, flash memory, and other memory devices. Memory devices 1604 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 1604 may store program modules, such as routines, programs, objects, images, data structures, program data, and other program modules that perform particular tasks or implement particular abstract data types that facilitate system use.

The I/O devices 1606 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1612 may permit communication between the various elements of node 1600. System interconnects 1612 may include a wide variety of signal lines including one or more of memory buses, peripheral buses, local buses, host buses, and bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   registering a deploy listener of a deploy service to receive status information relating to one or more of deploying of an application, and deploying of operations associated with the deploying of the application, wherein the operations are stored at a container in bi-directional communication with the deploy service via a container interface and a deploy communicator; and
   providing the status information to the deploy listener.

2. The method of claim 1, wherein the receiving of the status information is performed continuously using a first thread of a plurality of threads.

3. The method of claim 2, wherein the plurality of threads includes a second thread for deploying of the application.

4. The method of claim 1, wherein the deploy listener is created using a deploy callback implementation 5. The method of claim 1, wherein the deploying of the application is performed using a deploy tool.

6. The method of claim 1, wherein the deploy operations include one or more of deploy operation, start operation, stop operation, return operation, and update operation.

7. The method of claim 1, wherein status information is provided from one or more containers via a deploy callback stub via a deploy service stub.

8. The method of claim 7, wherein the deploy callback stub is implemented in the deploy service.

9. The method of claim 1, further comprises implementing a filter to selectively filter the status information.

10. A system comprising:
    a client computer system having a deploy listener of a deploy service to receive status information relating to one or more of deploying of an application, and deploying of operations associated with the deploying of the application, wherein the operations are stored at a container in bi-directional communication with the deploy service via a container interface and a deploy communicator, the container at a server coupled with the client; and
    the container at the server to provide the status information to the deploy listener at the client.

11. The system of claim 10, wherein the deploy listener to receive the status information continuously from the container using a thread of a plurality of threads.

12. The system of claim 10, wherein a deploy callback stub is implemented on a server having the container, the deploy callback stub is used to route the status information from the container to the deploy listener.

13. The system of claim 10, wherein the status information comprises a state of each of a plurality of deploy operations relating to deployment of a component, the plurality of deploy operations includes one or more of deploy operation, start operation, stop operation, remove operation, and update operation.

14. The system of claim 10, wherein the component comprises one or more of an application, a standalone module, a library, an interface, and a service.

15. A machine-readable medium comprising instructions which, when executed, cause a machine to:
    register a deploy listener of a deploy service to receive status information relating to one or more of deploying of an application, and deploying of operations associated with the deploying of the application, wherein the operations are stored at a container in bi-directional communication with the deploy service via a container interface and a deploy communicator; and
    provide the status information to the deploy listener.

16. The machine-readable medium of claim 15, wherein the receiving of the status information is performed continuously using a first thread of a plurality of threads.

17. The machine-readable medium of claim 16, wherein the plurality of threads includes a second thread for deploying of the application.

18. The machine-readable medium of claim 15, wherein the deploy listener is created using a deploy callback implementation interface.

19. The machine-readable medium of claim 15, wherein the deploying of the application is performed using a deploy tool.

20. The machine-readable medium of claim 15, wherein the deploy operations include one or more of deploy operation, start operation, stop operation, return operation, and update operation.

21. The machine-readable medium of claim 15, wherein status information is provided from one or more containers via a deploy callback stub via a deploy service stub.

22. The machine-readable medium of claim 15, wherein the deploy callback stub is implemented in the deploy service.

23. The machine-readable medium of claim 15, wherein the instructions which, when executed, further cause the machine to implement a filter to selectively filter the status information.

* * * * *